United States Patent
Youn et al.

(10) Patent No.: US 10,362,511 B2
(45) Date of Patent: Jul. 23, 2019

(54) METHOD AND APPARATUS FOR DETERMINING PDU SESSION IDENTITY IN WIRELESS COMMUNICATION SYSTEM

(71) Applicant: LG ELECTRONICS INC., Seoul (KR)

(72) Inventors: Myungjune Youn, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 15/598,104

(22) Filed: May 17, 2017

(65) Prior Publication Data

US 2017/0339609 A1    Nov. 23, 2017

Related U.S. Application Data

(60) Provisional application No. 62/337,349, filed on May 17, 2016, provisional application No. 62/405,265, (Continued)

(51) Int. Cl.
*H04W 36/00* (2009.01)
*H04W 76/11* (2018.01)
*H04W 36/14* (2009.01)

(52) U.S. Cl.
CPC ........ *H04W 36/0011* (2013.01); *H04W 76/11* (2018.02); *H04W 36/14* (2013.01)

(58) Field of Classification Search
CPC ......... H04W 36/0083; H04W 36/0011; H04W 64/00; H04W 76/11; H04W 36/14; H04W 36/0016; H04W 36/0022; H04W 36/0033; H04W 36/22; H04W 36/32; H04W 60/04; H04W 76/15; H04W 8/08; H04W 36/02; H04W 36/165; H04W 36/12; H04W 12/06; H04W 48/18; H04W 28/02; H04W 88/08; H04W 76/38; H04W 8/005; H04W 76/27; H04W 8/02; H04W 72/04; H04W 76/14;
(Continued)

(56) References Cited

U.S. PATENT DOCUMENTS

| | | | |
|---|---|---|---|
| 2013/0058292 A1* | 3/2013 | Wang | H04W 76/12 370/329 |
| 2014/0032531 A1* | 1/2014 | Ravi | G06Q 30/04 707/722 |

(Continued)

*Primary Examiner* — Wutchung Chu
(74) *Attorney, Agent, or Firm* — Lee Hong Degerman Kang & Waimey

(57) ABSTRACT

Disclosed are a method and apparatus for determining a PDU session identity in a wireless communication system. A method for determining, by a session management function (SMF) node, a packet data network (PDU) session identity during handover of user equipment (UE) in a wireless communication system, may include receiving a request message for requesting the establishment of a PDU session for the UE from an access and mobility management function (AMF) node, wherein a handover for the UE from a first wireless communication system to a second wireless communication system has been determined, determining a PDU session identity for the PDU session established for the UE when the request message is received, and sending a response message including the determined PDU session identity to the AMF node in response to the request message.

10 Claims, 18 Drawing Sheets

Related U.S. Application Data filed on Oct. 7, 2016, provisional application No. 62/418,801, filed on Nov. 8, 2016, provisional application No. 62/470,354, filed on Mar. 13, 2017.

(58) Field of Classification Search
CPC ........ H04W 76/20; H04L 67/14; H04L 69/08; H04L 29/08; H04L 63/10
See application file for complete search history.

(56) References Cited

U.S. PATENT DOCUMENTS

| | | | |
|---|---|---|---|
| 2017/0070892 A1* | 3/2017 | Song | H04L 41/042 |
| 2017/0171752 A1* | 6/2017 | Lee | H04W 12/04 |
| 2017/0288972 A1* | 10/2017 | Li | H04L 41/0803 |
| 2017/0289270 A1* | 10/2017 | Li | H04L 41/0803 |
| 2017/0289898 A1* | 10/2017 | Youn | H04W 48/14 |
| 2017/0303259 A1* | 10/2017 | Lee | H04W 28/16 |
| 2017/0317894 A1* | 11/2017 | Dao | H04L 41/509 |
| 2017/0331691 A1* | 11/2017 | Zhou | H04L 69/08 |
| 2017/0332421 A1* | 11/2017 | Sternberg | H04W 76/11 |
| 2018/0063707 A1* | 3/2018 | Lee | H04W 12/04 |
| 2018/0124660 A1* | 5/2018 | Zhang | H04W 36/22 |
| 2018/0332523 A1* | 11/2018 | Faccin | H04W 36/14 |

* cited by examiner

[FIG. 1]
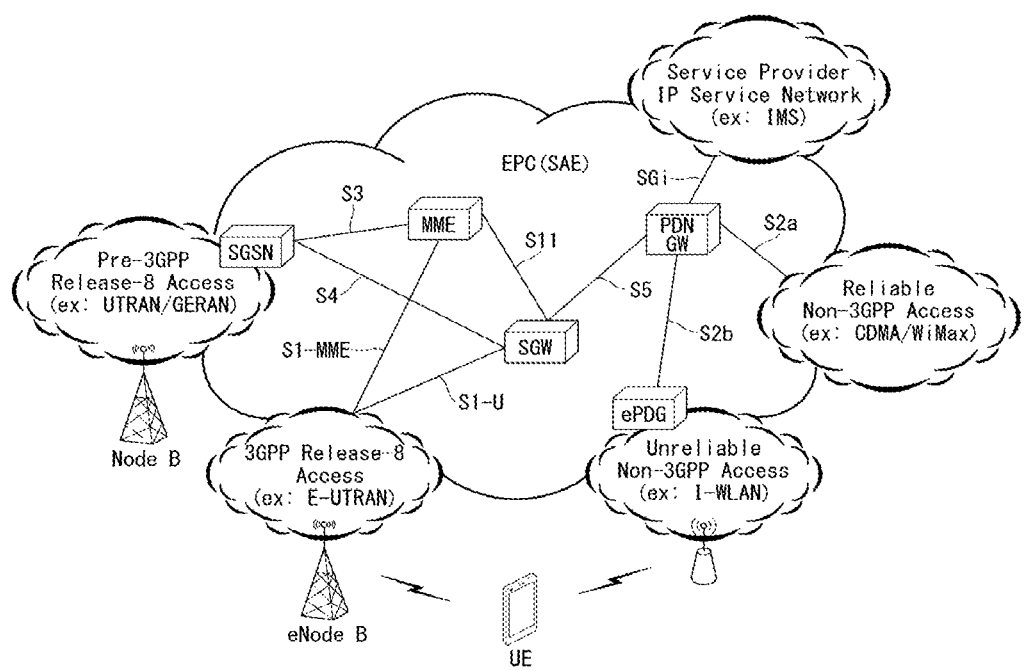

[FIG. 2]
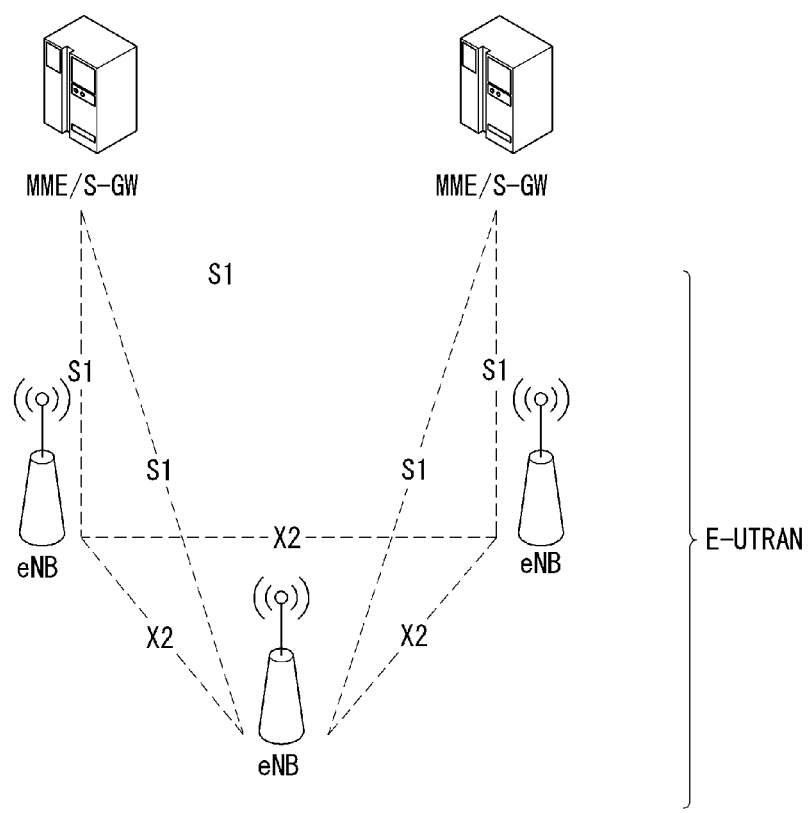

[FIG. 3]
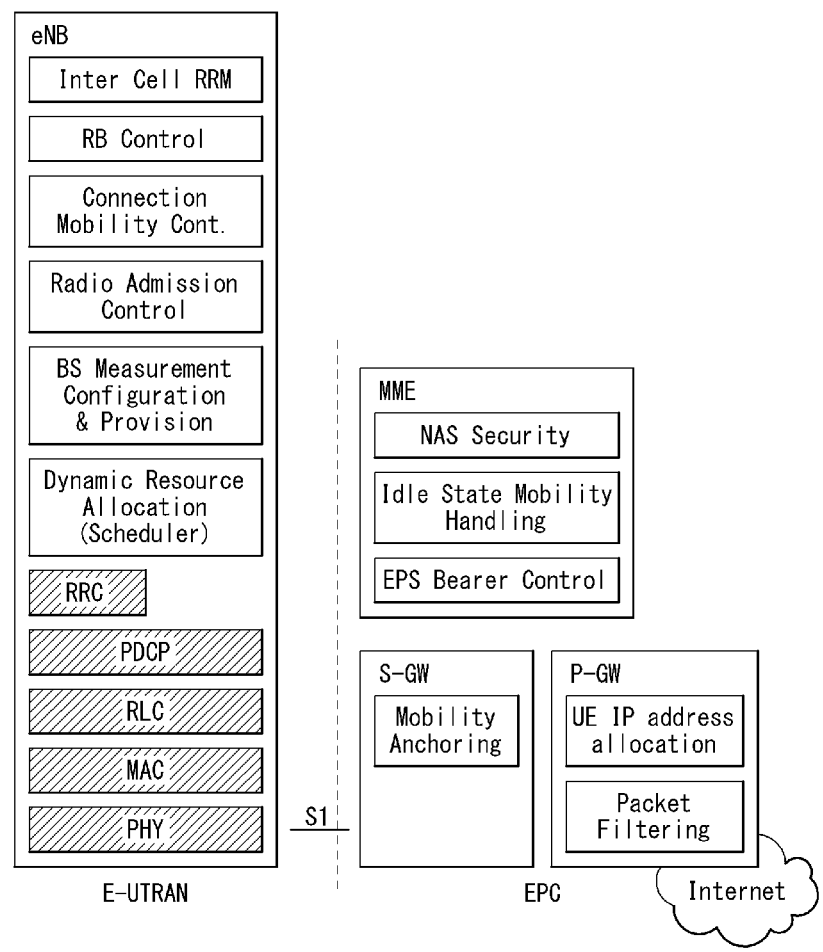

[FIG. 4]
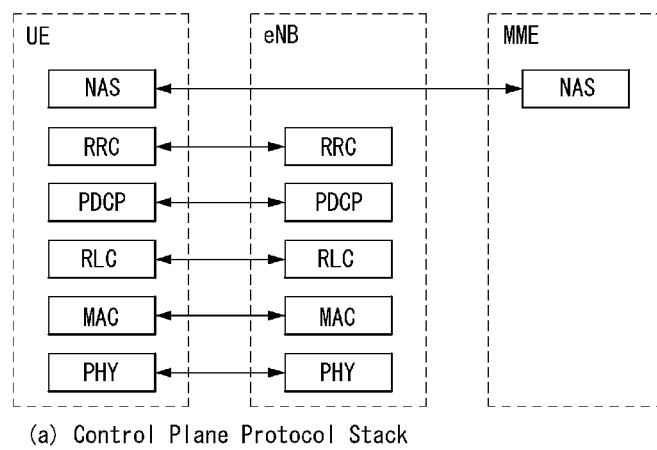
(a) Control Plane Protocol Stack
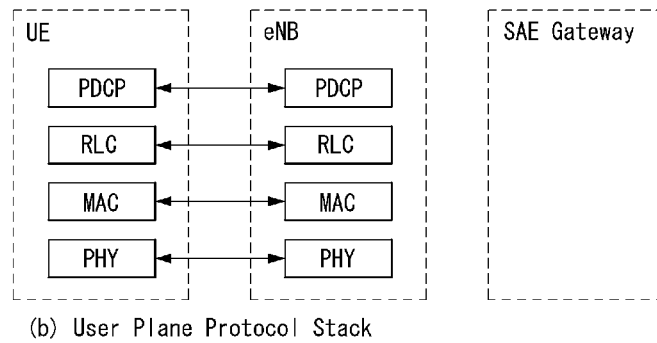
(b) User Plane Protocol Stack

[FIG. 5]
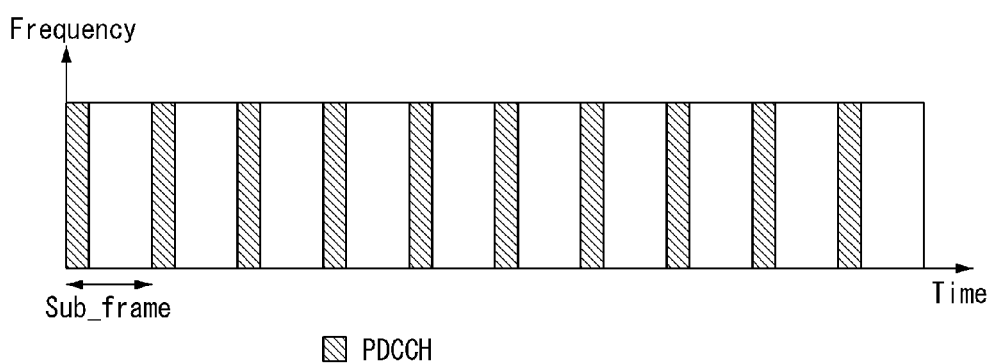

[FIG. 6]
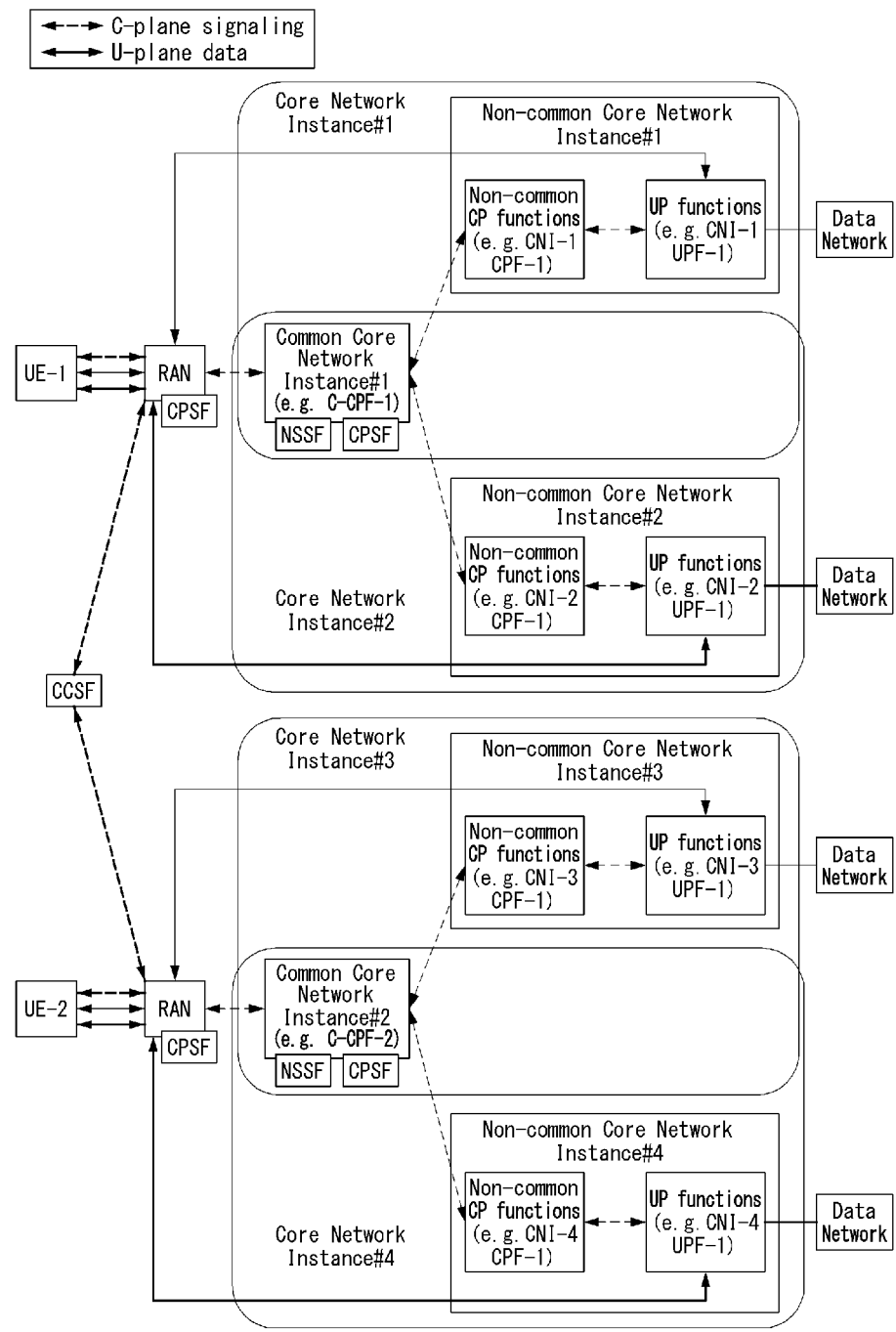

[FIG. 7]
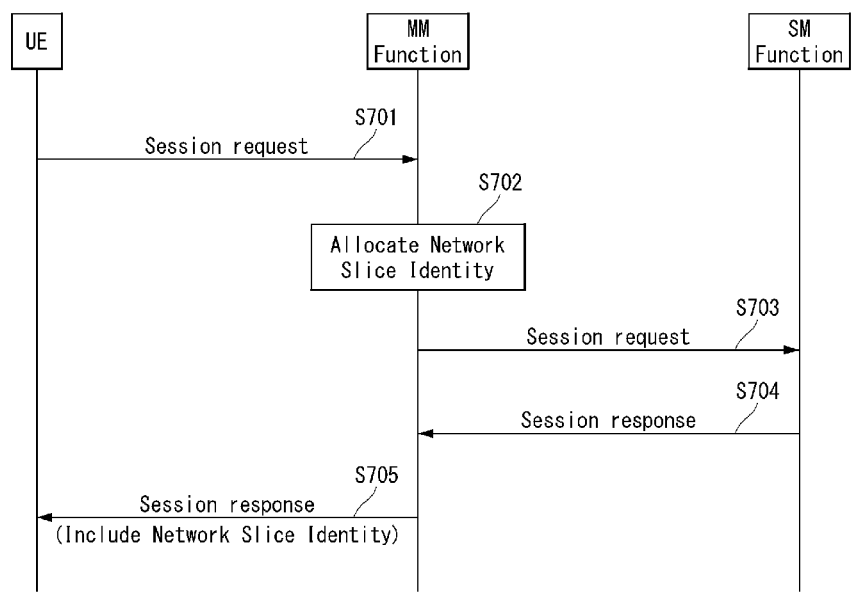

[FIG. 8]
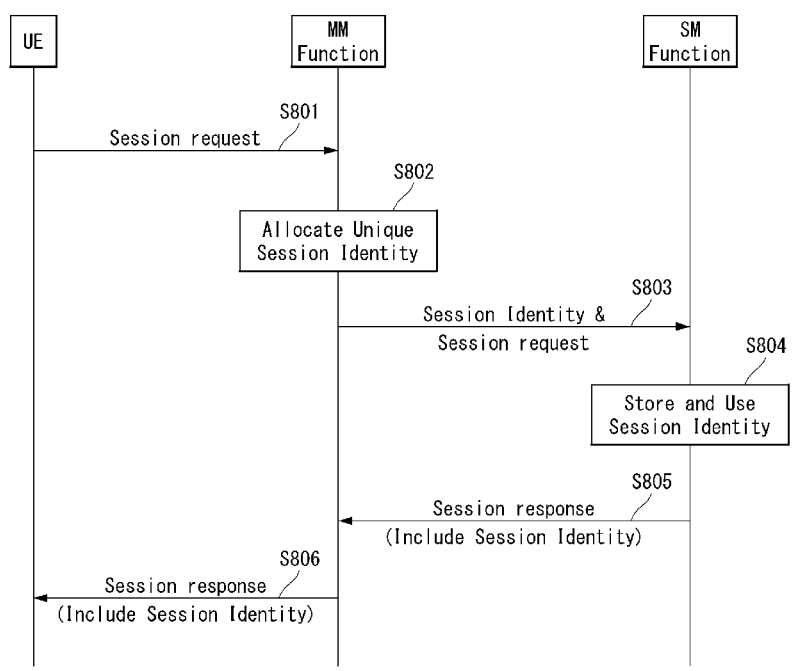

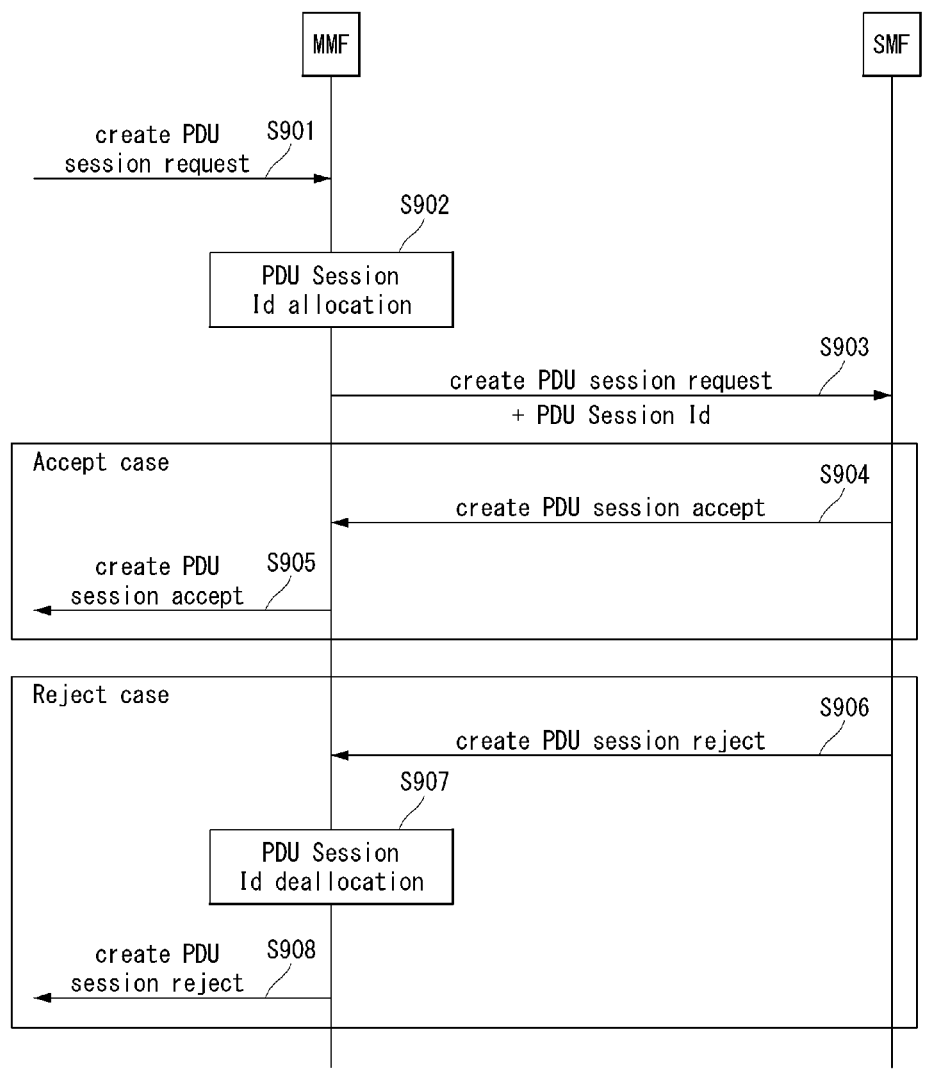
[FIG. 9]

[FIG. 10]
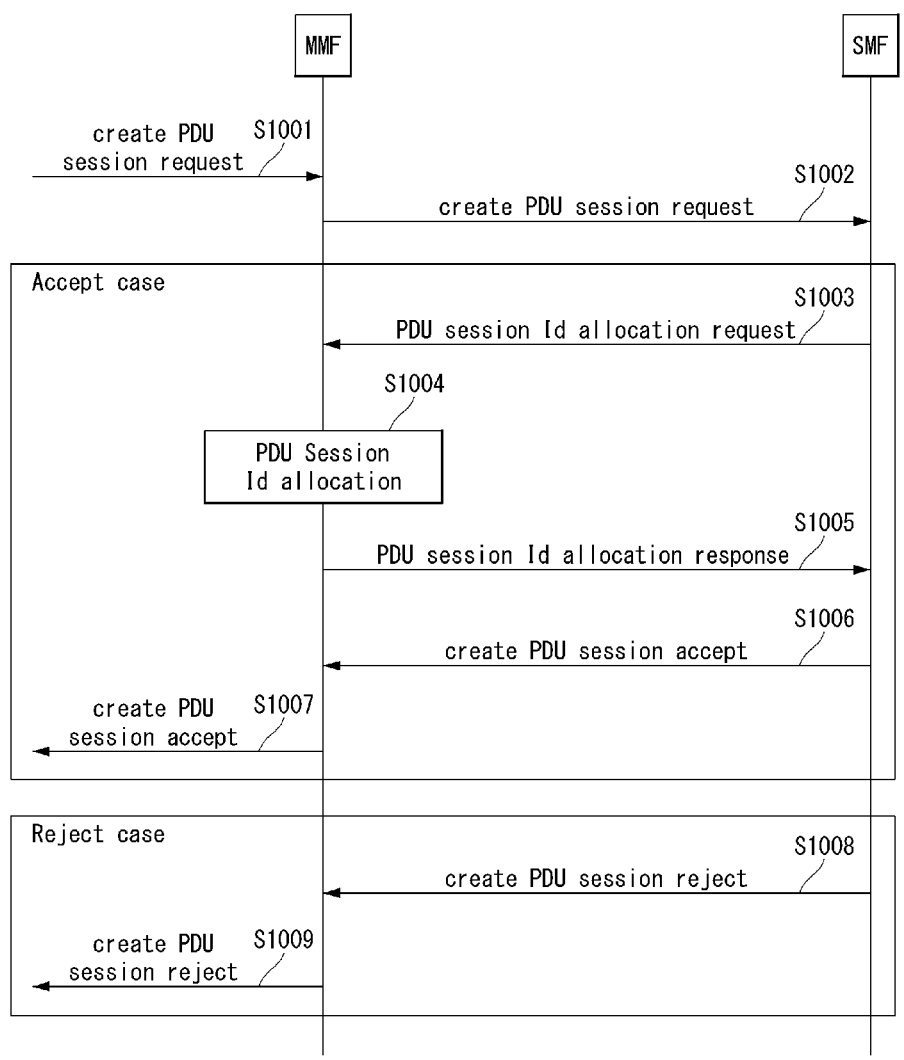

[FIG. 11]
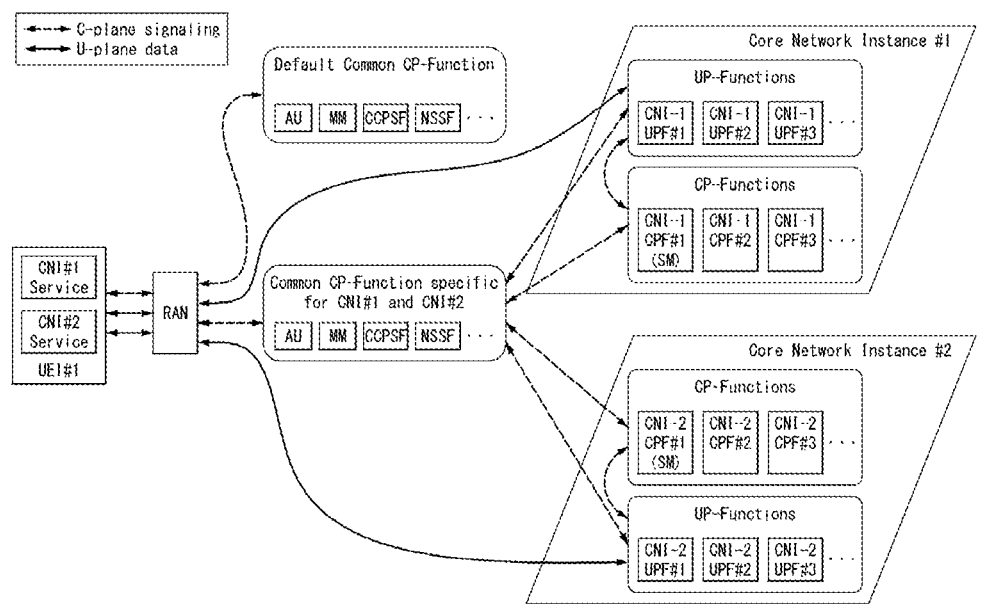

[FIG. 12]
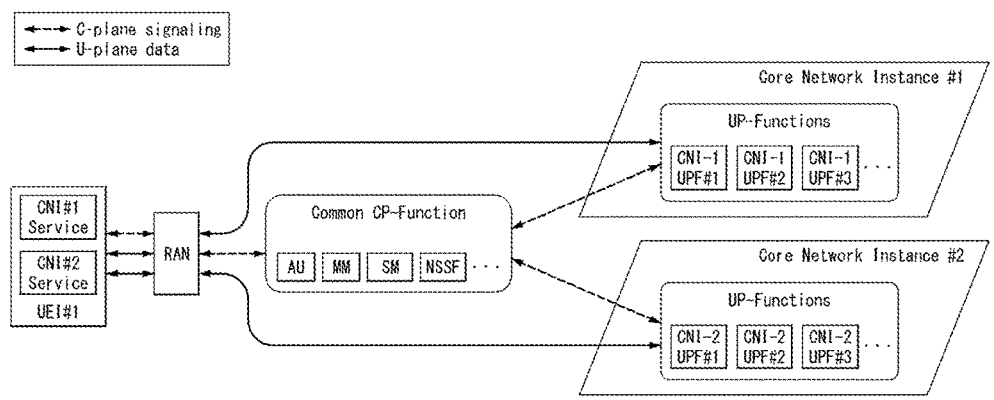

[FIG. 13]
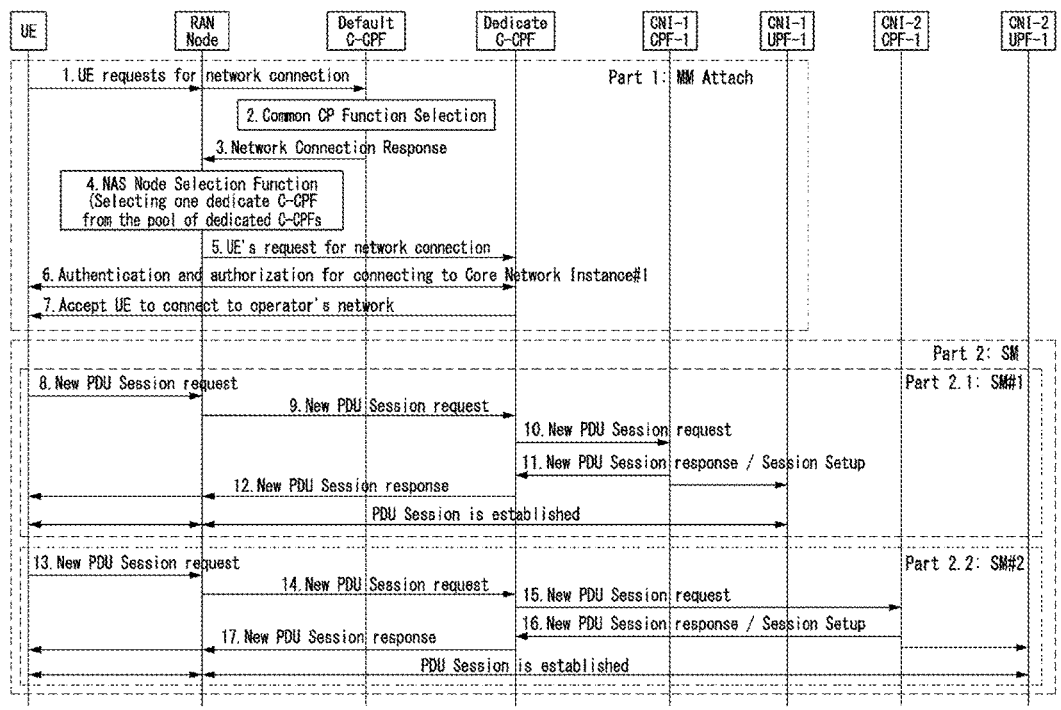

[FIG. 14]
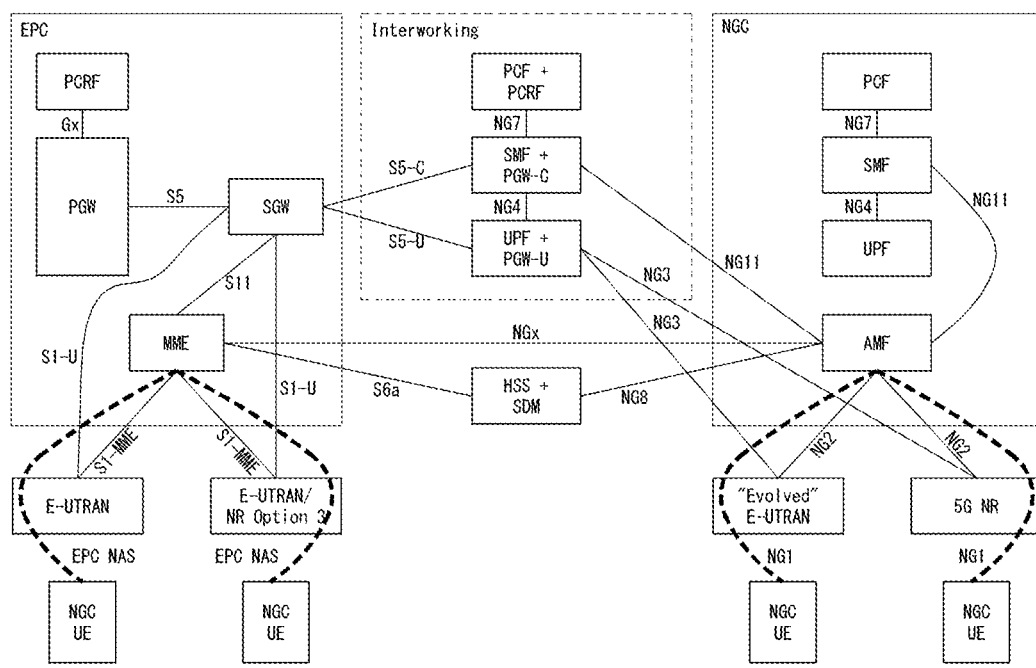

[FIG. 15]
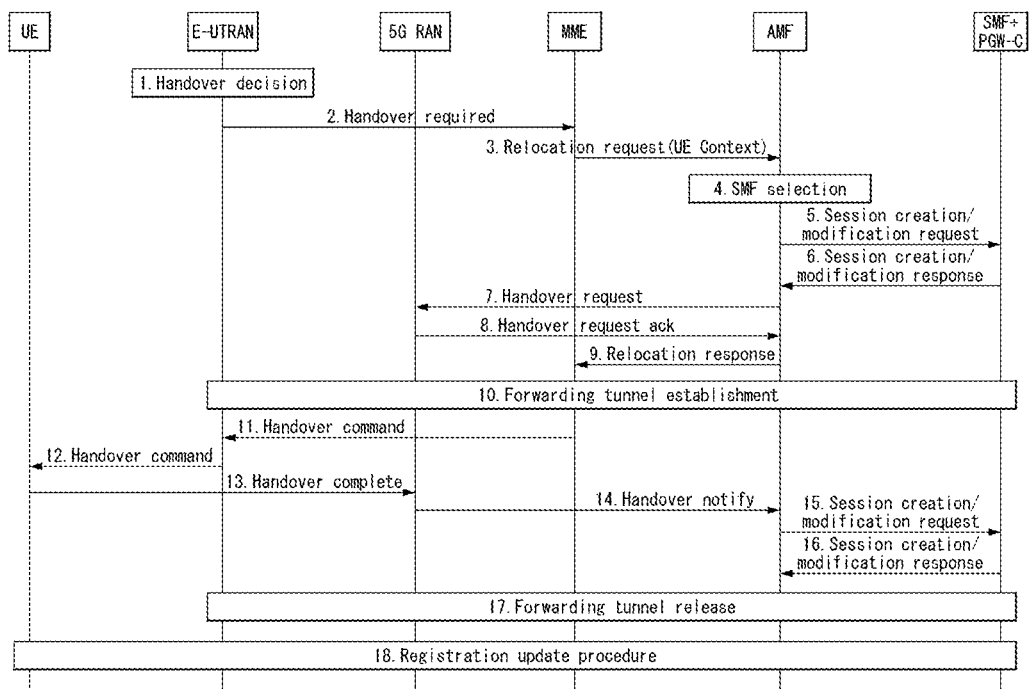

[FIG. 16]
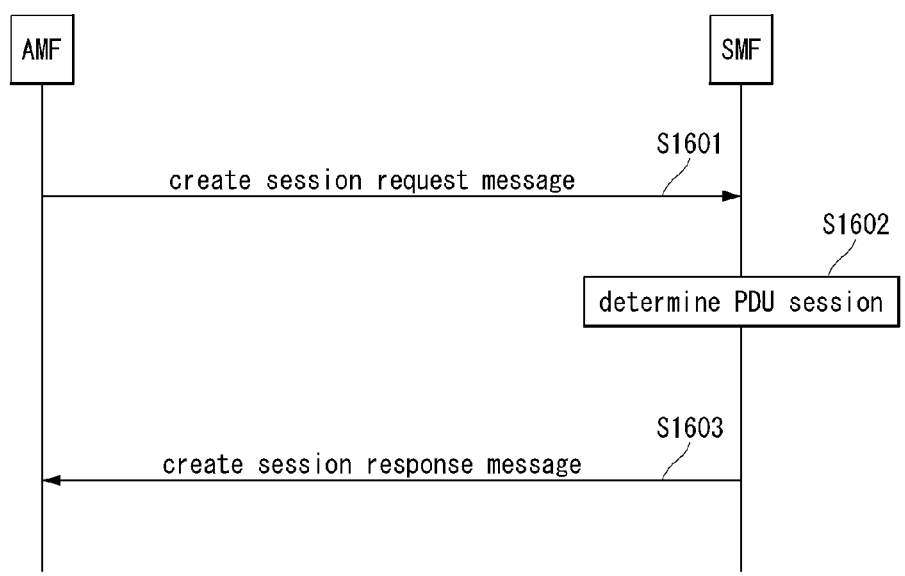

[FIG. 17]
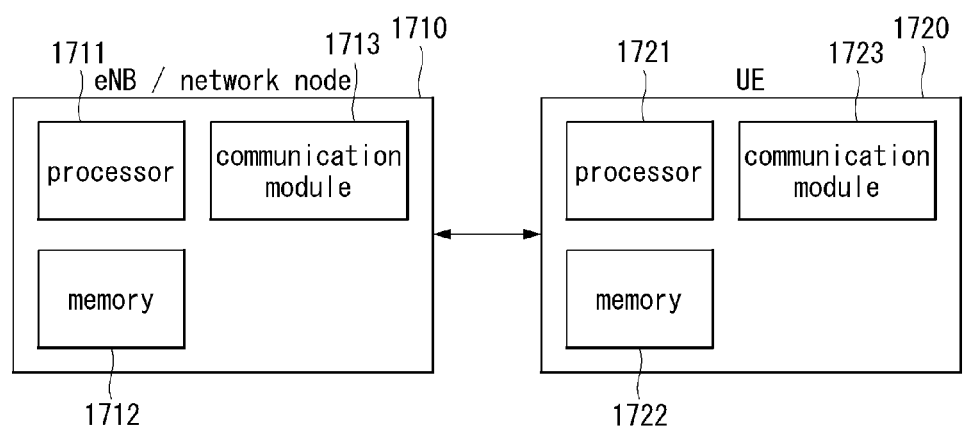

[FIG. 18]
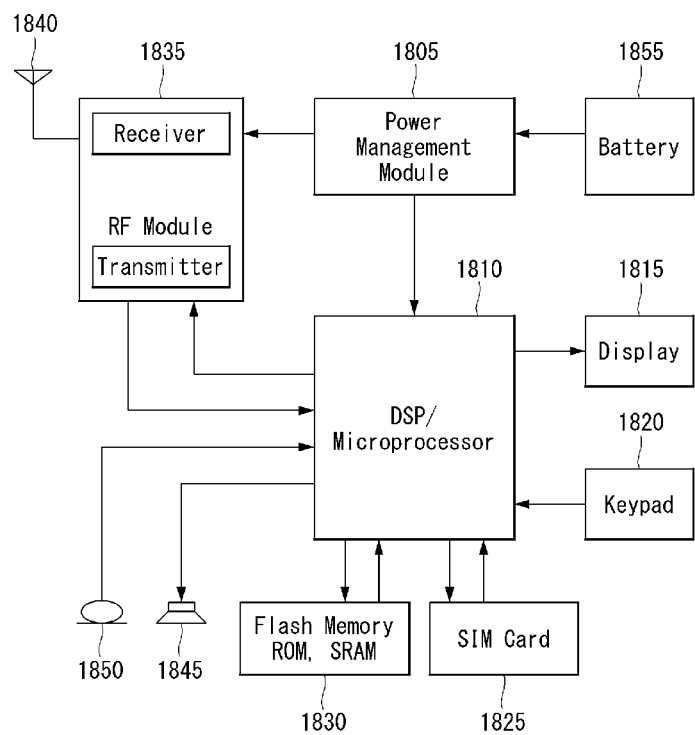

METHOD AND APPARATUS FOR DETERMINING PDU SESSION IDENTITY IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application Nos. 62/337,349, filed on May 17, 2016, 62/405,265, filed on Oct. 7, 2016, 62/418,801, filed on Nov. 8, 2016, and 62/470,354, filed on Mar. 13, 2017, the contents of which are all hereby incorporated by reference herein in their entirety.

BACKGROUND OF THE INVENTION

Field of the Invention

The present invention relates to a wireless communication system, and more specifically, to a method for allocating/determining a packet data network (PDN) session identity and an apparatus supporting the method.

Discussion of the Related Art

A mobile communication system has been developed to provide a voice service while guaranteeing user mobility. However, the service range of the mobile communication system has been extended to a data service as well as a voice service. Today, a resource shortage phenomenon is generated due to an explosive increase of traffic, and users request higher speed services. Accordingly, a more enhanced mobile communication system is required.

A next-generation mobile communication system should be able to support the acceptance of explosive data traffic, an epochal increase of the transmission rate per user, the acceptance of a large number of increased connection devices, very low end-to-end latency, and higher energy efficiency. For this reason, research is carried out on various technologies, such as dual connectivity, massive multiple input multiple output (MIMO), in-band full duplex, non-orthogonal multiple access (NOMA), super wideband support, and device networking.

SUMMARY OF THE INVENTION

In a next-generation wireless communication network, multiple network slices are supported to support different services, and the multiple network slices use a specific network node in common. For this reason, if a PDU session identity is allocated to a PDU session for each different network slice, a problem in that a PDU session identity is duplicated between PDU sessions for the same user equipment (UE) which have been established in several network slices.

An embodiment of the present invention proposes a method for allocating a PDU session identity when a PDU session is established.

Furthermore, an embodiment of the present invention proposes a method for allocating a PDU session identity when a PDU session for a UE is established in a next-generation wireless communication system in order to guarantee service continuity for a PDN connection which is used in a legacy wireless communication system if the UE handovers from a legacy wireless communication system (e.g., an LTE/LTE-A wireless communication system) to a next-generation wireless communication system (e.g., a 5G wireless communication system).

Objects to be solved by the present invention are not limited to the aforementioned objects and those skilled in the art will understand the other objects from the following description.

In an aspect of the present invention, a method for determining, by a session management function (SMF) node, a packet data network (PDU) session identity during handover of user equipment (UE) in a wireless communication system, may include receiving a request message for requesting the establishment of a PDU session for the UE from an access and mobility management function (AMF) node, wherein a handover for the UE from a first wireless communication system to a second wireless communication system has been determined, determining a PDU session identity for the PDU session established for the UE when the request message is received, and sending a response message including the determined PDU session identity to the AMF node in response to the request message.

In an aspect of the present invention, a session management function (SMF) node for determining a packet data network (PDU) session identity during handover of user equipment (UE) in a wireless communication system may include a communication module configured to send or receive a signal and a processor configured to control the communication module. The processor may be configured to receive a request message for requesting the establishment of a PDU session for the UE from an access and mobility management function (AMF) node, wherein a handover for the UE from a first wireless communication system to a second wireless communication system has been determined, determine a PDU session identity for the PDU session established for the UE when the request message is received, and send a response message including the determined PDU session identity to the AMF node in response to the request message.

A network slice including an access network (AN) and a core network (CN) may be included in the second wireless communication system. The AN and the AMF node may be common to multiple network slices. The SMF node may belong to each network slice.

The PDU session identity for the PDU session may be determined by combining a network slice identity to which the SMF node belongs and an identity for locally identifying the PDU session within the SMF node.

The network slice identity may be allocated by the AMF node, and the network slice identity may be included in the request message and received from the AMF node.

If multiple SMFs are present in the network slice, the PDU session identity for the PDU session may be determined by combining an SMF identity for identifying each SMF node within the network slice, a network slice identity to which the SMF node belongs and an identity for locally identifying the PDU session within the SMF node.

The network slice identity and the SMF identity of the SMF node may be allocated by the AMF node and may be included in the request message and received from the AMF node.

The PDU session identity for the PDU session may be allocated by the AMF node and may be determined by receiving the PDU session identity through the request message from the AMF node.

When the PDU session identity is allocated by the AMF node, an association between the PDU session identity and the identity of the SMF node may be generated by the AMF.

When the establishment of the PDU session is rejected, the association between the PDU session identity and the identity of the SMF node may be removed by the AMF.

The PDU session identity for the PDU session may be determined within a PDU session ID pool configured in the SMF node.

The PDU session identity for the PDU session may be determined by combining a globally unique ID allocated to the SMF node and an identity for logically identifying the PDU session within the SMF node.

In accordance with an embodiment of the present invention, each of PDU sessions can be precisely controlled by a network node because a unique identity is allocated to each PDU session.

Furthermore, in accordance with an embodiment of the present invention, in particular, although a UE is connected to several network slices, a specific PDU session-related message can be precisely transmitted or received between a UE and a network slice.

The effects of the present invention are not limited to the aforementioned effects and those skilled in the art will understand the other objects from the following description.

BRIEF DESCRIPTION OF THE DRAWINGS

For understanding of the present invention, the accompanying drawings included as part of the detailed description provide embodiments of the present invention and describe the technical characteristics of the present invention together with the detailed description.

FIG. 1 illustrates an evolved packet system (EPS) to which the present invention may be applied.

FIG. 2 illustrates an example of the network configuration of an evolved universal terrestrial radio access network (E-UTRAN) to which the present invention may be applied.

FIG. 3 illustrates the configuration of the E-UTRAN and the EPC in a wireless communication system to which the present invention may be applied.

FIG. 4 illustrates radio interface protocol architecture between UE and the E-UTRAN in a wireless communication system to which the present invention may be applied.

FIG. 5 illustrates the configuration of a physical channel in a wireless communication system to which the present invention may be applied.

FIG. 6 illustrates 5-generation (5G) system architecture to which the present invention may be applied.

FIG. 7 is a diagram illustrating a PDU session establishment procedure according to an embodiment of the present invention.

FIG. 8 is a diagram illustrating a PDU session establishment procedure according to an embodiment of the present invention.

FIG. 9 is a diagram illustrating a PDU session establishment procedure according to an embodiment of the present invention.

FIG. 10 is a diagram illustrating a PDU session establishment procedure according to an embodiment of the present invention.

FIGS. 11 and 12 illustrate architecture for supporting a multi-connection to multiple networks in a wireless communication system to which the present invention may be applied.

FIG. 13 illustrates a signaling flow for supporting connections with multiple core network instances to which the present invention may be applied.

FIG. 14 illustrates architecture for tight interworking in a wireless communication system to which the present invention may be applied.

FIG. 15 is a diagram illustrating a method for allocating a PDU session ID upon handover according to an embodiment of the present invention.

FIG. 16 is a diagram illustrating a method for allocating a PDU session ID according to an embodiment of the present invention.

FIG. 17 is a block diagram illustrating the configuration of a communication device according to an embodiment of the present invention.

FIG. 18 is a block diagram illustrating the configuration of a communication device according to an embodiment of the present invention.

DETAILED DESCRIPTION OF THE EMBODIMENTS

Hereinafter, embodiments of the present invention will be described in detail with reference to the accompanying drawings. A detailed description of the present invention to be described hereinafter together with the accompanying drawings describes embodiments of the present invention and does not represent a sole embodiment in which the present invention may be implemented. The following detailed description includes detailed contents in order to provide complete understanding of the present invention. However, a person having ordinary skill in the art may be aware that the present invention may be implemented without such detailed contents.

In several cases, in order to avoid a concept of the present invention from being ambiguous, well-known configurations and devices may be omitted or a core function of each configuration and device may be mainly shown in a block diagram form.

In this specification, a base station (Bs) may be replaced with a term, such as a fixed station, a Node B, an evolved-NodeB (eNB), a base transceiver system (BTS), an access point (AP), a RAN or a 5G-RaN. Furthermore, the term 'terminal' may be fixed or may mobile and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (d2d) device.

Hereinafter, downlink (DL) means communication from the BS to the terminal, and uplink (UL) means communication from the terminal t the base station. In downlink, a transmitter may be part of a BS and a receiver may be part of a UE. In uplink, a transmitter may be part of a UE and a receiver may be part of a BS.

Specific terms used in the following description are provided for understanding of the present invention, and use of such a specific term may be changed in other forms without departing from the spirit and scope of the present invention.

Exemplary embodiments of the present invention may be supported by standard documents that describe at least one of IEEE 802, 3GPP, and 3GPP2, which are wireless access systems. That is, in embodiments of the present invention, steps or portions that are not described to clearly expose the spirit and scope of the present invention may be supported by the documents. Furthermore, entire terms of this document may be described by the standard document.

For clear description, 3GPP LTE/LTE-A or 5-generation (5G) system is mainly described, but the technical characteristic of the present invention is not limited thereto.

Terms that may be used in this document are defined as follows.

- A universal mobile telecommunications system (UMTS): a 3-generation mobile communication technology based on global system for mobile communication (GSM) and developed by 3GPP,
- An evolved packet system (EPS): a network system configured with an evolved packet core (EPC), which is a packet-switched core network based on an Internet protocol (IP) and an access network, such as LTE and an UTRAN. The EPS is a network of a form in which the UMTS is innovated.
- A NodeB: a BS of an UMTS network. The NodeB is installed outdoor and covers a macro cell.
- An eNodeB: a BS of an EPS network. The eNodeB is installed outdoor and covers a macro cell.
- UE: a user device. The UE may be referred to as a term, such as a terminal, mobile equipment (ME) or a mobile station (MS). Furthermore, the UE may be a device that may be carried, such as a notebook computer, a mobile phone, a personal digital assistant (PDA), a smart phone or a multimedia device, or may be a device that may not be carried, such as a personal computer (PC) or a vehicle mounting device. In MTC-related contents, UE may be an MTC terminal.
- A public land mobile network (PLMN): A network configured as an object to provide a mobile communication service to individuals. The PLMN may be divided and configured on an operator basis.
- A 5G access network: an access network configured as a 5G radio access network (5G-RAN) and/or non-5G access network (non-5G-ANk) connected to a 5G core network.
- A 5G core network (5GC): a core network connected to a 5G access network.
- A 5G radio access network (5G-RAN): a radio access network which has a common characteristic that is connected through 5GC and that supports one or more of the following options:
  1) A standalone new radio.
  2) A new radio, that is, an anchor supporting the extension of E-UTRA.
  3) A standalone E-UTRA.
  4) An anchor supporting the extension of a new radio
- A 5G system (5GS): a 3GPP system including a 5G access network (AN), a 5G core network and UE
- A network function: it means a processing function adopted in 3GPP within a network or defined in 3GPP. The processing function includes a defined functional behavior and an interface defined in 3GPP.
- A packet data unit (PDU) connectivity service: a service that provides the exchange of a PDU(s) between UE and a data network.
- A PDU session: association between a data network and UE that provides a PDU connectivity service. The type of association may be an Internet protocol (IP) or Ethernet or may be un-configured.

Embodiments of the present invention are described based on the terms defined as described above.

System to which the Present Invention May be Applied

FIG. 1 illustrates an evolved packet system (EPS) to which the present invention may be applied.

A network configuration diagram of FIG. 1 simply illustrates the configuration of an EPS including an evolved packet core (EPC).

The EPC is the core element of system architecture evolution (SAE) for enhancing performance of 3GPP technologies. The SAE corresponds to a research subject to determine a network configuration that supports mobility between various kinds of networks. The SAE has a target that provides an optimized packet-based system that supports various wireless access technologies based on, for example, an IP and that provides a more enhanced data transfer ability.

More specifically, the EPC is the core network of an IP mobile communication system for a 3GPP LTE system and may support a packet-based real-time and non-real-time service. In the existing mobile communication system (i.e., the second-generation or third-generation mobile communication system), the function of the core network was implemented through two different sub-domains of circuit-switched (CS) for voice and packet-switched (PS) for data. However, in the advanced 3GPP LTE system of the third-generation mobile communication system, the sub-domains of CS and PS were unified into a single IP domain. That is, in the 3GPP LTE system, connection between UEs having an IP capability may be formed through an IP-based base station (e.g., an evolved Node B (eNodeB), an EPC, and an application domain (e.g., IMS). That is, the EPC is an essential configuration in implementing an end-to-end IP service.

The EPC may include various elements, and FIG. 1 illustrates a serving gateway (SGW or S-GW), a packet data network gateway (PDN GW) (or PGW or P-GW), a mobility management entity (MME), a serving general packet radio service (GPRS) supporting node (SGSN), and an enhanced packet data gateway (ePDG) corresponding to part of various elements.

The SGW operates as the boundary point between a radio access network (RAN) and a core network and is an element that performs the function of maintaining a data path between the eNodeB and the PDN GW. Furthermore, when the UE moves over an area served by the eNodeB, the SGW performs a function of a local mobility anchor point. That is, for mobility within a universal mobile telecommunications system (Evolved-UMTS) terrestrial radio access network defined after 3GPP release-8) (E-UTRAN), packets may be routed through the SGW. Furthermore, the SGW may function as an anchor point for mobility with another 3GPP network (RAN defined prior to the 3GPP release-8, for example, UTRAN or global system for mobile communication (GSM)/enhanced data rates for global evolution (EDGE) radio access network (GERAN)).

The PDN GW corresponds to a termination point of a data interface toward a packet data network. The PDN GW may support policy enforcement features, packet filtering, and charging support. Furthermore, the PDN GW may perform an anchor point function for mobility management with an unreliable network such as a 3GPP network and a non-3GPP network (e.g., an interworking wireless local area network (I-WLAN), a code division multiple access (CDMA) network or a reliable network such as a Wimax).

In the illustration of the network configuration of FIG. 1, the SGW and the PDN GW are configured as separate gateways, but the two gateways may be implemented as a single gateway configuration option.

The MME is an element that performs the signaling and control functions for supporting access to network connection of the UE, the allocation of a network resource, tracking, paging, roaming and handover. The MME controls control plane functions related to a subscriber and session management. The MME manages many eNodeBs and performs signaling for selection of a conventional gateway for handover of another 2G/3G network. Furthermore, the MME performs a function of security procedures, UE-to-network Session Handling, and idle UE location management.

The SGSN handles the entire packet data, such as user mobility management and authentication of another 3GPP network (e.g., a GPRS network).

The ePDG functions as the security node of an unreliable non-3GPP network (e.g., I-WLAN, WiFi hotspot).

Referring to FIG. 1, the UE having an IP capability may access an IP service network (e.g., IMS) in which a provider (i.e., operator) provides via various elements within the EPC based on 3GPP access and non-3GPP access.

Furthermore, FIG. 1 illustrates various reference points (e.g., S1-U, S1-MME). In the 3GPP system, a concept link that connects two functions existing at different functional entities of the E-UTRAN and the EPC is defined to a reference point. Table 1 represents a reference point of FIG. 1. In addition to an illustration of Table 1, various reference points may exist according to a network configuration.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g., in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

In the reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of the network configuration of an evolved universal terrestrial radio access network (E-UTRAN) to which the present invention may be applied.

The E-UTRAN system is an advanced system of the existing UTRAN system, and may be a 3GPP LTE/LTE-A system, for example. The communication networks are widely disposed to provide various communication services, such as a voice service (e.g., a voice over Internet protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an evolved packet core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an evolved packet system (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, access stratum (AS) security control, core network (CN) inter-CN signaling for supporting mobility between 3GPP access networks, IDLE mode UE reachability (including the execution and control of paging retransmission), tracking area identity (TAI) management (for idle and active mode UE), PDN GW and SGW selection, MME selection for handover in which the MME is changed, SGSN selection for handover to a 2G or 3G 3GPP access network, roaming, authentication, a bearer management function including dedicated bearer establishment, and public warning system (PWS) (including an earthquake and tsunami warning system (ETWS) and commercial mobile alert system (CMAS)) message transmission support.

FIG. 3 illustrates the configuration of the E-UTRAN and the EPC in a wireless communication system to which the present invention may be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE_ACTIVE state. As described above, a gateway within the EPC may perform a function of origination, LTE_IDLE state management, ciphering of a user plane, a System Architecture Evolution (SAE) bearer control, and ciphering and integrity protection of NAS signaling.

FIG. 4 illustrates radio interface protocol architecture between UE and the E-UTRAN in a wireless communication system to which the present invention may be applied.

FIG. 4A illustrates a wireless protocol configuration of a control plane, and FIG. 4B illustrates a wireless protocol configuration of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data is transmitted between different physical layers and between the physical layer of a transmitting UE and the physical layer of a receiving UE through the physical channel. The physical layer is modulated with an orthogonal frequency division multiplexing (OFDM) method and uses a time and a frequency as a radio resource.

Several physical control channels are used in the physical layer. A physical downlink control channel (PDCCH) notifies UE of the resource allocation of a paging channel (PCH) and downlink shared channel (DL-SCH) and hybrid automatic repeat request (HARQ) information related to an uplink shared channel (UL-SCH). Furthermore, the PDCCH may transmit an UL grant that notifies UE of the resource allocation of uplink transmission to the UE. A physical control format indicator channel (PDFICH) notifies UE of the number of OFDM symbols used for PDCCHs and is transmitted for each subframe. A physical HARQ indicator channel (PHICH) transmits a HARQ acknowledge (ACK)/non-acknowledge (NACK) signal in response to uplink transmission. A physical uplink control channel (PUCCH) transmits uplink control information, such as HARQ ACK/NACK, a scheduling request, and a channel quality indicator (CQI) for downlink transmission. A physical uplink shared channel (PUSCH) transmits an UL-SCH.

The MAC layer of the second layer L2 provides a service to a radio link control (RLC) layer, which is a superordinate layer through a logical channel. Furthermore, the MAC layer includes a mapping function between the logical channel and the transport channel and a multiplexing/demultiplexing function to a transport block provided to a physical channel on a transport channel of a MAC service data unit (SDU) that belongs to the logical channel. The RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

The packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at the lowermost portion of a third layer L3 is defined in only the control plane. The RRC layer performs the function of controlling a radio resource between the UE and the network. For this reason, UE and the network exchange an RRC message through the RRC layer. The RRC layer controls a logical channel, a transport channel, and a physical channel in relation to a configuration, a re-configuration, and release of radio bearers. For data transmission between UE and a network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as the superordinate layer of the RRC layer performs a function of session management and mobility management.

One cell forming a BS is set to one of bandwidths such as 1.25, 2.5, 5, 10, and 20 MHz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is the superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to UE. The DCCH is a point-to-point bi-directional channel used by UE having RRC connection that transfers dedicated control information between the UE and the network. The DTCH is a point-to-point channel used for only one UE in order to transfer user information that may exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates the configuration of a physical channel in a wireless communication system to which the present invention may be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Method of Identifying PDU Session

Today, in 3GPP, a network configuration, such as that of FIG. 6, is being discussed.

FIG. 6 illustrates 5-generation (5G) system architecture to which the present invention may be applied.

Referring to FIG. 6, several slices (i.e., network slices) for supporting different services are present in a network.

The network slice may mean a logical network including a set of network functions (NFs) and corresponding resources necessary to provide a specific network capability and network characteristics. That is, the network slice may include both a 5G-AN and a 5G CN. A network slice instance (NSI) or a network instance is an instantiation of a network slice. That is, the NSI may mean a set of deployed NFs that provide an intended network slice service according to a network slice template.

FIG. 6 illustrates network slices including only CNs, for convenience of description. In this specification, this is called a core network slice or a core network instance (CNI).

Furthermore, the slices may use some network functions (NFs) in common.

As illustrated in FIG. 6, a portion (i.e., NF) shared by a plurality of network slices is defined as a common core network instance (CNI), and a portion (i.e., NF) not shared by a plurality of network slices is defined as a non-common core network instance (CNI).

In LTE/LTE-A networks, mobility and session management have been managed by one node called the MME. In the 5G network, however, such mobility and session management are divided into a mobility management (MM) function and a session management (SM) function and discussed.

The common CNI may include the function of managing the mobility of UE (i.e., an MM function (MMF) or an access and mobility management function (AMF)). The non-common CNI may include the function of managing the session of UE (i.e., an SM function (SMF)).

The MMF (or AMF) may also be called a common control plane function (C-CPF).

FIG. 6 illustrates two common CNIs, that is, a common CNI #1 and a common CNI #2, and shows an example in which the common CNI #1 and the common CNI #2 include a C-CPF-1 and a C-CPF-2, respectively.

Furthermore, the common CNI may include a network slice selection function (NSSF) and/or a control plane selection function (CPSF). In other words, the MMF (or AMF or C-CPF) may include the NSSF and/or the CPSF.

Furthermore, the common CNI may be simply called an MMF (or AMF or C-CPF).

Furthermore, the common CNI may also be called a common control plane (CP), and the non-common CNI may be simply called a CNI.

The non-common CNI may include a non-common control plane (CP) function and a non-common user plane (UP) function.

FIG. 6 illustrates four non-common CNIs, that is, a non-common CNI #1, a non-common CNI #2, a non-common CNI #3, and a non-common CNI #4, and shows an example in which the non-common CNI #1, the non-common CNI #2, the non-common CNI #3, and the non-common CNI #4 include CNI-1 CPF-1/CNI-1 UPF-1, CNI-2 CPF-1/CNI-2 UPF-1, CNI-3 CPF-1/CNI-3 UPF-1, and CNI-1 CPF-4/CNI-4 UPF-1, respectively.

In the architecture of FIG. 6, the common CPs (i.e., common CNI) relay a session-related message to an SMF in the core network instance (i.e., non-common CNI).

In the network configuration, such as FIG. 6, when UE sends a session request message (e.g., a PDU session establishment request message) to a network for a service (i.e., in order to establish a PDU session), a common CNI may check/determine that the session request message has to be transmitted to which network slick (i.e., a non-common CNI) and then transfer the session request message to a corresponding network slice.

In this case, an NSSF and a CPSF within the common CNI may check/determine that the session request message has to be transferred to which network slice.

Thereafter, when an SMF within a non-common CNI generates a session and sends a response message in response to the session request message to an MMF within the common CNI, the MMF may transfer the response message to the UE.

One UE may be served by one or more network slice instances (i.e., non-common CNIs) at the same time over a 5G-AN (the RAN in FIG. 6).

An MMF (or AMF) that provides the service to the UE may belong to each network slice instance (i.e., a non-common CNI) that serves the UE. That is, the MMF (or AMF) instance may be in common to network slice instances (i.e., non-common CNIs) that serve the UE.

A PDU session may belong to a specific network slice instance (i.e., non-common CNI). Although different network slices have a slice-specific PDU session using the same data network name (DNN), the different network slices instance (i.e., non-common CNI) may not share the PDU session.

An SMF selection function (e.g., CPSF) may be supported by the MMF (or AMF). The SMF selection function (e.g., CPSF) may be used to allocate an SMF that manages the PDU session.

According to a conventional method, since the SMF manages a PDU session, a PDU session identity is allocated by the SMF, and it is used by UE and other network functions for session management (e.g., session modification and session termination).

If UE is served by a single network slice, an MMF (or AMF) within a common CNI may transfer a session-related message to a corresponding network slice without additional information because a network slice to which a session-related message has to be transmitted has always been determined.

However, in accordance with an existing method, if UE has been connected to several network slices (i.e., non-common CNIs), session IDs allocated by an SMF may be duplicated because an SMF within each of different network slices allocates a session ID (or session identity). In this case, there may be a problem in that an MMF (or AMF) is unaware that a session-related message has to be transferred to which network slice (i.e., which non-common CNI).

Embodiments of the present invention propose methods for solving the problem.

Option 1. A method Using a Different PDU Session ID Pool for Each Non-Common CNI Option 1 is to use a different PDU session identity pool in each core network instance (i.e., non-common CNI). This mechanism is similar to an IP address pool in each P-GW. For example, a core network instance #1 has a PDU session identity pool from 1 to 100 and a core network instance #2 has a PDU session identity pool from 101 to 200.

That is, a PDU session ID pool may be preconfigured in an SMF within a non-common CNI by an operator.

In this case, the range of a PDU session ID allocated in each SMF may be determined within the pool only.

That is, when the SMF receives a session request message from UE via an MMF (or AMF), it may generate a PDU session and allocate a PDU session ID to a corresponding PDU session. When the PDU session ID is allocated, the SMF may select the PDU session ID randomly or using a specific rule within a preconfigured PDU session identity pool. Furthermore, when the SMF sends a session response message to the UE via MMF (or AMF) as a response to the session request message, it may include the session response message in the allocated PDU session ID and send the session response message.

As described above, a PDU session ID is determined within a set PDU session identity pool for each SMF. Although several SMFs individually allocate PDU session IDs to sessions, only an always unique value according to a corresponding session may be configured in UE and an MMF (or AMF).

This mechanism is simple, but an operator should configure each PDU session identity pool both in a common CP (i.e., common CNI) and a core network instance (i.e., non-common CNI). As a result, flexibility is low and the scale-in/scale-out capability may be limited because a maximum number of PDU sessions are limited by the capacity of the PDU session identity pool.

Option 2. A Method of Allocating a Network Slice ID

Option 2 is to use a network slice identity and to provide it to UE during a session establishment procedure. An operator configuration is not needed, but each session management message should contain a network slice identity. Then, the UE recognizes a network slice, which may be undesirable by an operator who does not want to expose a network configuration.

FIG. 7 is a diagram illustrating a PDU session establishment procedure according to an embodiment of the present invention.

Referring to FIG. 7, UE sends a session request message to an

When the MMF (or it may be a separate independent function) within a common CNI generates a session and selects a network slice (i.e., non-common CNI), it may notify the UE and an SMF of a network slice identity.

The MMF (or AMF) may allocate a network slice identity to a selected network slice (i.e., non-common CNI) (S702).

Alternatively, when the MMF (or AMF) receives a session response message from the SMF, it may allocate the network slice identity to the selected network slice (i.e., non-common CNI). That is, step S702 may be performed after step S704.

Furthermore, the MMF (or AMF) may transfer the session request message to the SMF within the selected network slice (i.e., non-common CNI) (S703).

The SMF may allocate a PDU session ID to a corresponding session and send a session response message as a response to the session request (S704).

The MMF (or AMF) may include the allocated network slice identity in the session response message, received from the SMF, and send the session response message to the UE (S705).

Accordingly, the UE may be aware of information about the network slice (i.e., non-common CNI) allocated thereto.

The UE may send the allocated network slice identity and PDU session ID through a session-related message whenever it sends the session-related message. In this case, the MMF may determine that the corresponding session-related message has to be transmitted to which network slice using the network slice identity included in the session-related message.

Alternatively, the MMF (or AMF) may transfer the network slice identity to the SMF (S703). Furthermore, when the SMF generates the PDU session ID, it may generate the PDU session ID by including network slice identity in the PDU session ID. In this case, the MMF (or AMF) may not directly transfer the network slice identity to the UE unlike in FIG. 7.

Furthermore, the MMF (or AMF) may directly send the network slice identity to the SMF (S703). The SMF may include the network slice identity in the session response message and send the session response message to the MMF. Even in this case, the MMF (or AMF) may not directly transfer the network slice identity to the UE unlike in FIG. 7.

Option 3. A method of Allocating, by a Common CNI (MMF/AMF) a PDU Session Identity (ID)

Option 3 is to assign a PDU session identity in common CPs (i.e., common CNIs (MMF/AMF)). An SMF manages PDU sessions, but the PDU session identity is allocated by the common CPs (i.e., common CNIs (MMF/AMF)) so that the PDU session identity is not duplicated. However, this option does not comply with network slicing architecture in which all of SM-related functions are located in a core network instance (i.e., a non-common CNI).

FIG. 8 is a diagram illustrating a PDU session establishment procedure according to an embodiment of the present invention.

Referring to FIG. 8, UE sends a session request message to an MMF (or AMF) (S801).

When the MMF (or it may be a separate independent function) within a common CNI receives the session request message from the UE, it may directly allocate a PDU session ID (S802).

In this case, if the MMF (or AMF) has information about all of network slices to which the UE is connected and directly allocates the PDU session ID, unique values may be allocated without the duplication of PDU session IDs.

In a conventional technology, a PDU session ID has been determined by an SMF, but such a technology may be called a method for being performed only a portion among the operation of the SMF that the PDU session ID is allocated by a common CNI. That is, in the conventional technology, the SMF directly manages a session. In this method, however, an interaction between two nodes is required because some functions of the SMF have moved to the MMF.

The MMF (or AMF) sends the allocated PDU session ID to an SMF along with the session request message (S803).

The SMF stores and uses the PDU session ID allocated by the MMF (or AMF) (S804).

In this case, when the MMF directly transfers the session request message as in FIG. 8, it may directly include the PDU session ID in the session request message or may transfer the PDU session ID to the SMF independently of the session request message.

The SMF includes the PDU session ID, allocated by the MMF, in a session response message and sends the session response message to the MMF (S805).

In this case, when the MMF allocates the PDU session ID, it may allocate the PDU session ID so that it has dependency on each network slice. For example, Nos. 1~10 PDU session IDs may be allocated to a network slice 1, and Nos. 2~10 PDU session IDs may be allocated to a network slice 2.

In this case, only the PDU session ID is transferred to the UE, but the MMF has allocated the PDU session ID to the UE so that the PDU session ID has dependency on each network slice depending on the policy of the MMF. Accordingly, the UE may check even information about a network slice that manages a corresponding session.

In the situation in which the MMF allocates the PDU session ID as described above, the SMF may reject the generation of the PDU session requested by the UE. In this case, the MMF needs to perform an operation for removing the previously allocated PDU session ID.

To this end, the MMF has to check SM messages (i.e., the session request message, the session response message and the session reject message) exchanged between the UE and the SMF. If the generation of the PDU session is rejected as a result of the check, the MMF has to perform an operation for deallocating/removing the PDU session ID. This is described below with reference to FIG. 9.

FIG. 9 is a diagram illustrating a PDU session establishment procedure according to an embodiment of the present invention.

Referring to FIG. 9, UE sends a session request message (e.g., a create PDU session request message) to an MMF (or AMF) (S901).

When the MMF (or it may be a separate independent function) within a common CNI receives the session request message from the UE, it may directly allocate a PDU session identity (S902).

The MMF (or AMF) sends the allocated PDU session ID to an SMF along with the session request message (S903).

If the session requested by the UE is accepted by a network, the SMF sends a session accept message (e.g., a create PDU session accept message) to the MMF (or AMF) as a response to the session request message (S904).

The MMF (or AMF) sends the session accept message to the UE (S905).

In contrast, if the session requested by the UE is rejected by the network, the SMF sends a session reject message (e.g., a create PDU session reject message) to the MMF (or AMF) as a response to the session request message (S906).

When the MMF (or AMF) receives the session reject message from the SMF, it deallocates the PDU session ID allocated to a corresponding session (i.e., the session whose creation was requested by the UE) at step S902 (S907).

Furthermore, the MMF (or AMF) sends a session reject message to the UE (S908).

Furthermore, in addition to the example of FIG. 9, when the MMF (or AMF) receives a message that accepts the release of the PDU session from the SMF, the MMF may recognize the message and has to deallocate the PDU session ID allocated to a corresponding session.

If the PDU session is implicitly released without signaling between the UE and the SMF, there is a problem in that it is difficult for the MMF (or AMF) to be aware of such implicit release. In order to solve such a problem, a method of recognizing, by the MMF (or AMF), that a PDU session has been implicitly released using a timer may be applied, but such a method has low accuracy.

As a result, the MMF (or AMF) has to always monitor SM messages between the UE and the SMF as described above. In order to solve such a problem, the MMF (or AMF) may allocate a PDU session ID only when the SMF requests an allocation of the PDU session ID. This is described below with reference to FIG. 10.

FIG. 10 is a diagram illustrating a PDU session establishment procedure according to an embodiment of the present invention.

Referring to FIG. 10, UE sends a session request message (e.g., a create PDU session request message) to the MMF (or AMF) (S1001).

When the MMF (or it may be a separate independent function) within a common CNI receives the session request message from the UE, it transfers the session request message to an SMF (S1002).

If the session requested by the UE is accepted by a network, the SMF sends a PDU session ID allocation request message to the MMF (or AMF) in order to request the allocation of a PDU session ID (S1003).

When the MMF (or AMF) receives the PDU session ID allocation request from the SMF, it may directly allocate a PDU session identity (S1004).

Furthermore, the MMF (or AMF) sends a PDU session ID allocation response message, including the allocated PDU session identity, to the SMF (S1005).

The SMF sends a session accept message (e.g., a create PDU session accept message) to the MMF (or AMF) as a response to the session request message (S1006).

The MMF (or AMF) transfers the session accept message to the UE (S1007).

In contrast, if the session requested by the UE is rejected by the network, the SMF sends a session reject message (e.g., a create PDU session reject message) to the MMF (or AMF) as a response to the session request message (S1008).

When the MMF (or AMF) receives the session reject message from the SMF, it transfers the session reject message to the UE (S1009).

That is, in accordance with the method of FIG. 10, the MMF may transfer an SM message to the SMF or the UE regardless of whether the SM message received from the UE or the SMF is which SM message. Furthermore, when the MMF receives a request to allocate a PDU session ID from the SMF, it may allocate the PDU session ID and notify the SMF of the allocated PDU session ID.

Although not illustrated in FIG. 10, when the SMF releases the PDU session, it has to notify the MMF of the release of the PDU session and to send a request for the deallocation of the PDU session ID to the MMF.

As a result, in accordance with such a method, the MMF does not need to always monitor SM messages between the UE and the SMF, but there is a disadvantage in that signaling for exchanging PDU session ID allocation/deallocation request messages between the MMF and the SMF is increased.

Option 4. A Method Using a Globally Unique SMF Identity (ID)

If each SMF has a globally unique ID, when the SMF allocates a PDU session ID, it may include its own unique ID in the PDU session ID and allocate the PDU session ID.

If such a method is used, a load for signaling may be increased because the size of the PDU session ID may be excessively increased.

The reason why a unique SMF ID is not used within a PLMN is that if UE uses PDU sessions of a local breakout method and a home-routed method at the same time when performing roaming, an SMF having a session established with one UE may be located in a different PLMN. Accordingly, there is a problem in that a roaming scenario is not supported if a unique SMF ID is used within a PLMN.

If several SMFs are present within a single non-common CNI, the method of Option 1, Option 3 and Option 4 may be applied. In the case of Option 1, a different pool may be set for each SMF. In the case of Option 3, several SMFs may identically operate although they are located within a single slice because an MMF allocates a PDU session ID.

In contrast, in the case of Option 2, a PDU session is identified based on a combination of a network slice identity and a session ID. Accordingly, if several SMFs are present within a single network slice, there is a problem in that sessions cannot be clearly distinguished. In order to solve such a problem, an MMF within a common CNI may allocate a network slice identity, may also allocate an ID by which an SMF within a non-common CNI can be uniquely identified, and may transfer the network slice identify and the ID to an SMF and UE. In this case, a unique PDU session ID can be allocated while maintaining the PDU session ID to a small size compared to Option 4.

Table 2 illustrates advantages and disadvantages of the methods according to the options.

TABLE 2

|  | Advantages | Disadvantages |
|---|---|---|
| Option 1 | A simple method because each SMF allocates a session ID within a pool | Low flexibility because an operator has to preconfigured an ID pool within each SMF |
| Option 2 | High flexibility because a PDU session ID can be dynamically allocated. The size of a PDU session ID can be reduced because a global ID is not used. | A complicated allocation process because a PDU session ID includes a combination of several IDs. |
| Option 3 | No need for a pool configuration and a simple session ID allocation method because an MMF allocates a session ID. | An MMF and an SMF are not fully separated because an MMF performs an operation that must be performed by an SMF. This option cannot be used if an MMF managing 3GPP access and an MMF managing non-3GPP access are separated. (in order to use this option, a PDU session needs to be separately stored and managed for each access. |
| Option 4 | A simple method because each SMF allocates a session ID. | Flexibility may be low and the size of a PDU session ID may be excessively increased because an operator has to perform setting so that each SMF has a globally unique session ID. |

FIGS. 11 and 12 illustrate architecture for supporting a multi-connection to multiple networks in a wireless communication system to which the present invention may be applied.

FIG. 11 illustrates architecture for a case where a common control (C)-plane function set is used in common between multiple core network instances.

To enable UE to simultaneously obtain services from multiple network slices of one network operator, the core network instances may be set up as depicted in FIG. 11.

That is:

A single set of C-plane functions that are in common among core network instances is shared across multiple core network instances;

U-plane Functions and other C-plane functions that are not in common reside in their respective core network instances, and are not shared with other core network instances.

common C-plane functions to multiple core network instances may be:

An authentication function (AU) (or authentication server function (AUSF)): AU is responsible for authenticating and authorizing UE to attach to the operator's network. It also provides security and integrity protection of NAS signaling.

Mobility Management function (MM) (or AMF): MM is responsible for UE registration in the operator's network (e.g., the storing of UE context) and UE mobility support (e.g., providing mobility function when UE is moving across base stations within the operator's network).

Dedicated C-plane functions for each core network instances may be:

Session Management function (SM): SM is responsible for the PDU session establishment, the PDU session modification and the PDU session termination.

As a deployment option all the C-plane functions may be deployed as part of a common C-plane function as described in FIG. 12.

FIG. 12 illustrates architecture for a case where all of C-plane functions within a common CP function are shared with respect to all of core network instances.

The direct CP interface between RAN and CP-functions of CN instance is not needed, since the encrypted NAS signaling message has to be decrypted by a common C-Plane function, which has exchanged the encrypted key with UE, for example, the AU function.

In case of UE accessing a single a core network instance, RAN may have a direct CP interface to the specific CP function located within a core network instance. In such case, those CP functions depicted as a part of common CP function are considered to be CP functions resided within a core network instance, and hence, there is no common CP function.

The principles of the solution depicted in FIG. 11 are described as following:

A core network instance consists of a single set of C-plane functions and a single set of U-plane functions.

A core network instance is dedicated to UEs that belong to the same UE type. Identifying the UE type is done by using a specific parameter, e.g. The UE usage type and/or information from the UE's subscription.

A set of C-plane functions is responsible, for example, for supporting UE mobility if demanded or for admitting UE into the network by performing authentication and subscription verification.

All C-plane functions that are common to multiple core network instances, are not necessary to be created multiple times.

Other C-plane functions that are not in common with other core network instances are only used by its own a core network instance.

A set of U-plane functions in a core network instance is responsible for providing a specific service to UE and for transporting the U-Plane data of the specific service. For example, one set of U-Plane functions in a core network instance #1 provides an enhanced mobile broadband service to UE, whereas another set of U-Plane functions in a core network instance #2 provides a critical communication service to UE.

Each UE may have multiple U-Plane connections to different sets of U-plane function that are available at different core network instances simultaneously.

The network slice Selection Function (NSSF) is responsible for selecting which a core network instance to accommodate the service/session request by UE by taking into account the UE's subscription and the specific parameter, e.g. The UE Type, the service type or Domain Network Name (DNN) that may be mapped to represent the service type that the CNI supports.

The RAN communicates with the common CP function or the common CP function specific for CNI via a single CP interface regardless of which CP function within the common CP that the RAN is communicating with. Hence, a common CP is considered as a black box.

The Common C-Plane Selection Function (CCPSF) is considered to be a part of common CP function, i.e., The CCPSF is assumed to be located in the common CP function. The CCPSF is responsible for determining which common C-plane function that the Base Station should communicate with. Determination of common C-plane function is done by checking with UE's subscription profile. If the common C-plane function needs to be changed, CCPSF in the serving common C-plane function is responsible for reselecting target common C-plane function.

The CCPSF is not a function to route the NAS signaling message to the right common C-plane function. In this solution, it is assumed that the RAN has a function to route the NAS signaling message to a proper common C-plane function by taking the information that is sent by the CCPSF in case of the first initial connection request or by UE in case of any subsequent NAS messages.

Both default common CP function and common CP function specific for CNI have the MM, AU, CCPSF and the NSSF as depicted in the FIG. 11. However, there may be different variants of MM and AU function. For instance, MM for MBB service might be different than the MM for MTC service. In case, UE want to connect both the services, only one common CP function selected as explained in FIG. 12.

When UE establishes a PDU session, the PDU session is identified as follows:

Option A: Each core network instance has instance identity which uniquely identifies a core network instance. This identity is transferred to UE and the UE includes a core network instance identity in each session management message. The PDU session is identified by combining a core network instance Identity and the PDU session identity assigned by SMF.

Option B: C-plane functions that are common to multiple core network instances allocates PDU session identity when UE requests new PDU session. The PDU session identity is transferred to the SMF.

Option C: Operator configures different PDU session identity pool in each core network instance.

Option D: UE assigns the PDU session identity and it is sent to the network during the PDU session establishment procedure.

In this solution, the "UE usage type", "DCN-ID", "service type" and "DNN" are used for the purposes as described below:

"UE usage type" is used for identifying the type of UE, e.g., Car UE usage type, Smartphone UE usage type. This is a parameter only available in the CN and UE is not aware of it. Similar to Décor and eDecor, different PLMNs expect to apply the same set of values for standardized UE usage type.

"DCN-ID" is used for identifying a dedicated CN (DCN) that is specific for each UE usage type. In addition, an operator may consider to use the DCN-ID to identify a DCN that is specific for the enterprise of the same UE usage type or even for the different variants of dedicated CN. An example for the latter case could be to have different variants of dedicated CN for Cellular Internet of Things (CIoT) UEs, i.e., supporting different CIoT optimization features as specified in 3GPP TS 23.401. In other words, the DCN-ID is used to determine which common CP function that is specific for this UE usage type and (optionally) for a specific enterprise of this UE usage type. For instance, one could think of having a different DCN for different car enterprises, although UE from these enterprises belong to the same type of UE. This is the parameter that may be preconfigured at UE or provided/updated by the CN during the initial Attach procedure. Similar to Décor and eDecor, this DCN-ID may be standardized value or PLMN specific. When the UE roams to a visited PLMN, the UE may provide this DCN-ID to the CN. If the temporary UE identity for this visited PLMN is not provided by the UE, the RAN may use this DCN-ID to route the Attach request to the common CP function according to its RAN pre-configuration. In case this DCN-ID is not up-to-date for the visited PLMN, redirection to another dedicate common CP function that corresponds to the latest UE's subscription is hence needed.

"service type" is used for identifying what type of service that a core network instance (CNI) is supposed to support, e.g., the car UE may want to access multiple CNIs simultaneously that supports eMBB service and V2X service. There may be both standardized service type applicable to all of PLMNs or a PLMN-specific service type. This service type will be stored in UE and may be updated according to the operator's policy from the PLMN that the UE is roaming to.

A "Domain Network Name (DNN)" is used for identifying the packet data network (PDN) that UE wants to communicate with for a certain service type, e.g., DNN #1 for Internet service that requires mobile broadband service.

A temporary UE identity is a temporary identifier provided by the CN to UE. This is similar to GUTI in EPS case. This temporary UE identity consists of two parts: 1) identifier of a common CP function, 2) a UE-specific identifier. The RAN routes the UE's NAS signaling message to the address of the common CP function as specified in the temporary UE identity.

Taking the above explanation into account, selecting a proper CNI for the service type that is requested by the UE may be done by using the DNN parameter.

In FIGS. 11 and 12, a core network instance may be interpreted in the same manner as the non-common core network instance of FIG. 6. Furthermore, in FIGS. 11 and 12, the common CP-function may be interpreted in the same manner as the common core network instance of FIG. 6.

Furthermore, the common CP-function may be called an AMF. In this case, the CCPSF and/or NSSF may be supported by the AMF. Furthermore, the AU (or AUSF) may be configured as a node different from the common CP-function (or AMF).

Taking the above explanation into account, selecting a proper CNI for the service type that is requested by the UE may be done by using the DNN parameter.

FIG. 13 illustrates a signaling flow for supporting connections with multiple core network instances to which the present invention may be applied.

1. When UE first connects to an operator's network or registers to the PLMN for the first time and there is no sufficient information for the RAN to route this network connection request to an appropriate common C-plane function, the UE sends a network connection request to the RAN, which is then further forwarded to the default common C-plane function. The flow continues in step 2.

If the UE provides the DCN-ID along with this network connection request, but does not provide a temporary UE identity, the RAN uses this DCN-ID to determine an appropriate Common CP that supports this DCN-ID, and the flow continues in step 4. In addition, the UE may provide other information, e.g., service type and/or DNN along with this network connection request.

If the UE provides the temporary UE identity, the RAN uses the temporary UE identity to determine a common CP function specific for CNI-1 and CNI-2 and, the flow continues in step 4. In addition, the UE may provide other information, e.g., DCN-ID, service type and/or DNN along with this network connection request.

When the UE sends a request to connect to an operator's network, UE may request to establish a session for a particular service by sending the DNN along with this network connection request. If this is the case, after the authentication and authorization in step 6 has been performed, the C-CPF specific for CNI-1 and CNI-2 will establish the session for the request service like similar to step 9, 10 and 11.

2. The CCPSF located in the default C-CPF determines which Common C-Plane function to be connected to by taking into account information in the network connection request from UE in step #1. In addition, other information from the subscription database may be also considered. For example, the UE's subscription may indicate that for this UE, the operator should set up a session with the particular CNI. In this signaling flow example depicted in FIG. 15, this is a core network instance #1.

If a default C-CPF determines that it will serve this UE's network connection request, it either continues with the authentication and admitting the UE to attach/connect to operator's network or reject this UE's network connection request and hence this procedure ends in this step. It is to note that this specific case is not depicted in FIG. 15 for simplicity of the signaling flow.

3. The default C-CPF sends a response to the RAN node with the Common C-Plane function specific for CNI-1 and CNI-2, for which the UE to attach. Same content of UE's network connection request in step #1 and may also include e.g., DCN-ID from step #2 is also sent back to the RAN.

4. If the UE provides a temporary UE identity, this means that the UE has been once registered at the PLMN, and the CN has provided the UE the DCN-ID, which the UE should be connected. Hence, the RAN uses only the temporary UE identity to route the NAS message to the appropriate common CP function.

In case there is a pool of common C-plane functions that are dedicated for this UE usage type and/or for this DCN-ID provided by the UE or by the default common C-plane function in step #3, the RAN node performs NAS Node Selection Function (NNSF) similar to what we have for the NNSF in eNB.

5. The RAN node routes the UE's network connection request to the common C-plane function specific for CNI-1 and CNI-2. Along with this request, it may contain other information like the DNN to enable the C-CPF specific for CNI-1 and CNI-2 to select a CNI that is specific for a certain service type. If the C-CPF specific for CNI-1 and CNI-2 rejects the UE's network connection request, the C-CPF specific for CNI-1 and CNI-2 sends a NAS reject message to the UE.

6. Authentication and admitting the UE to attach/connect to operator's network is performed.

In this step, the key for decrypting NAS message between the UE and the common CP function specific for CNI-1 and CNI-2 is also provided.

7. The common CP function specific for CNI-1 and CNI-2 sends a network connection accept response to the UE. In this response, it contains the temporary UE identity and the information, for which the UE is to be configured, e.g., which DCN-ID, its corresponding service type and/or corresponding DNN that the UE is allowed to connect. In case, the DCN-ID newly provided does not match to the ones that the UE already has, the DCN-ID(s) will be configured at the UE.

8. UE requests for establishment of a session for a communication service (e.g., service #1 that is provided by a core network instance #1) by sending an SM request for a new PDU session. In this the PDU session request, the UE provides the DCN-ID and DNN.

9. The RAN forwards the PDU session request to an appropriate Common C-Plane function specific for CNI-1 and CNI-2 by using the DCN-ID information sent by the UE.

10. The NSSF in the C-CPF specific for CNI-1 and CNI-2 selects the C-plane function of a core network instance #1 by using the DNN information that may be mapped to represent the service type that the CNI supports in the PDU session request, and forwards the UE's the PDU session request for the service #1 to the CPF-1 in a core network instance #1 (CNI-1 CPF-1), which is responsible for session management in CNI#1. Note that this forwarded the PDU session request still contains the information that has been sent by the UE such as the UE usage type, DCN-ID and DNN.

11. The CPF-1 in a core network instance #1 sends the session setup message to the UPF-1 in a core network instance #1 for session establishment. After a successful session establishment, the CPF-1 in a core network instance #1 sends the session response back to the C-CPF specific for CNI-1 and CNI-2.

12. The C-CPF specific for CNI-1 and CNI-2 sends a new service response back to the UE via RAN. After this step, the UE is successfully connected to a core network instance #1 with an active the PDU session.

13. The UE requests the establishment of another session for a new communication service that is of a different service type than the previous service. In the PDU session request, the UE provides the temporary UE identity, UE usage type, DCN-ID, and service type and/or DNN.

14. The RAN determines the common C-plane function specific for CNI-1 and CNI-2 by using the temporary UE identity sent by the UE and forwards the PDU session request to the common C-plane function specific for CNI-1 and CNI-2.

15. The C-CPF specific for CNI-1 and CNI-2 selects C-plane function of a core network instance #2 by using the DNN information in the PDU session request, and forwards the UE's service request for the new service to the CPF-1 in a core network instance #2 (i.e., CNI-2 CPF-1), which is responsible for session management in CNI #2. Note that this forwarded the PDU session request still contains the information that has been sent by the UE such as the UE usage type, DCN-ID, and service type and/or DNN.

16. The CPF-1 in the core network instance #2 sends the session setup message to the UPF-1 in the core network instance #2 for session establishment. After a successful session establishment, the CPF-1 in the core network instance #2 sends the session response back to the C-CPF specific for CNI-1 and CNI-2.

17. The C-CPF specific for CNI-1 and CNI-2 sends a new service response back to the UE via RAN. After this step, the UE is successfully connected to a core network instance #2 with an active the PDU session.

As described above, there are four options (i.e., option A to D) to assign the PDU session identity.

Those options A to D may be separated by two methods. One method is a UE-based solution and the other is a network-based solution.

In the EPS, a default bearer id is used to identify a PDN connection and it is assigned by a network, i.e., the MME.

If UE allocates a PDU session ID, a network needs to validate the ID because there is a possibility of mis-configuration or malfunctioning.

But the SMF doesn't have enough information to validate the UE provided identity because the SMF doesn't have other the PDU session information assigned by another SMF. The SMF needs to exchange signaling with the MMF to validate the PDU session information. The signaling should be performed whenever new PDU session is established. So it is proposed to assign the PDU session ID by the network Therefore, the present invention proposes that a network allocates a PDU session identity.

There are three network-based solutions (i.e., options A to C).

In option B, common CP functions (i.e., the common CNI) may allocate the PDU session identity. The possible common CP function may be an MMF (or AMF). So this option may be not aligned with network slicing architecture which all of SM-related functions are located in a core network instance (i.e., non-common CNI). If two different MMFs are required when UE simultaneously attached using 3GPP access and non-3GPP access, this option is not a feasible option.

In option C may be using different PDU session identity pool in each network slice Instance (NSI). This mechanism is similar to IP address pool in each P-GW. This mechanism is simple but operator should configure each PDU session identity pool both in Common CP and NSI.

As a result, flexibility is low and may limit scale-in/scale-out capability because the number of maximum the PDU session is limited by capacity of PDU session identity pool. When UE is roaming and has two different PDU sessions, i.e., one for home-routed roaming and the other for local breakout, this option cannot be used because operator configured pool is unique in its PLMN.

In option A, a PDU session may be identified by a combination of an NSI identity and a PDU session identity which is locally assigned by an SMF. During the PDU session establishment procedure, NSI identity is transferred to the UE and the UE includes NSI identity in the session management message. The NSI identity is also used by the MMF to route SM messages. In this option, it is assumed that there is one SMF in each NSI. If there are multiple SMFs in an NSI, the MMF needs to allocate SMF identity unique in the NSI.

Therefore, the PDU session may be identified by combination of NSI identity and the PDU session identity locally assigned by the SMF. In case there are multiple SMFs in an NSI, the MMF needs to allocate the SMF identity unique in the NSI. The PDU session is identified by combination of NSI identity, the SMF identity assigned by the MMF and the PDU session identity.

When the UE establishes the PDU session, the PDU session is identified as follows:

Each core network instance has instance identity which uniquely identifies a core network instance. This identity is assigned by the MMF (or AMF) and transferred to the UE. The UE includes a core network instance Identity in each session management message. The PDU session is identified by combining a core network instance identity and a PDU session identity assigned by the SMF.

If there are multiple SMFs in a core network instance, the MMF allocates the SMF identity unique in a core network instance. In this case, a PDU session is identified by a combination of a core network instance identity, an SMF identity allocated by the MMF, and a PDU session identity allocated by the SMF.

Network slicing is described in brief as follows based on the contents of the above description.

- A network slice may be a complete logical network (providing Telecommunication Services and Network Capabilities) including an AN and a CN. In this case, the AN may be common to multiple network slices.
- UE may provide network slice selection assistance information (NSSAI) consisting of a set of parameters to the network to select the set of RAN and CN part of the network slice instances (NSIs) for the UE.
- If a network deploys network slicing, then it may use UE-provided network slice selection assistance information to select a network slice.
- UE may access multiple slices simultaneously via a single RAN. In such a case, those slices may share some control plane functions, e.g., an MM.
- If UE obtains a UE temporary ID, the UE shall provide it to an RAN during an RRC connection establishment, so that NAS signaling messages transmitted over the RRC connection are routed to a core network function instance identified by the temporary ID.
- UE provides NSSAI info to the Next Generation (NextGen) Core over NG1 (Reference point for the control plane between NextGen UE and NextGen Core).
- The CN part of network slice instance(s) serving UE is selected by CN not RAN.
- A PDU session may be identified by combination of a network slice Instance (NSI) identity and the PDU session identity which is locally assigned by the SMF. In case there are multiple SMFs in an NSI, MMF needs to allocate SMF identity unique in the NSI. The PDU session may be identified by combination of NSI identity, SMF identity assigned by MMF and the PDU session identity.

An interaction between the MM and the SM may be performed as follows.

UE having multiple established PDU sessions may be served by different instances of an SMF. An MMF selects SMF for PDU sessions. The MMF may select different SMF for different PDU sessions.

However, how the MMF selects the SMF has not been defined.

Accordingly, an embodiment of the present invention proposes an operation of selecting, by the MMF, the SMF based on session-related information (e.g., a DNN) provided by UE in order to clearly define an interaction between the MMF and the SMF. That is, the MMF may use the session-related information (e.g., DNN) provided by the UE.

Furthermore, in relation to PDU session identification, today, in accordance with the solution (i.e., an interaction between MM and SM) of 3GPP TR 23.799 Paragraph 6.4.16, a PDU session identity may be allocated by an MMF. The solution of Paragraph 6.4.16 is as follows.

The PDU session identity is allocated by the MMF: when it starts a new PDU session, the UE uses a default dummy the PDU session identity and upon reception of the corresponding SM signaling, the MMF allocates the PDU session identity for that the PDU session When the MMF detects NAS SM signaling with a new PDU session identity, it allocates a SMF for this new PDU session and stores the association between the SMF Id and the PDU session Id;

When the MMF detects NAS SM signaling with a known the PDU session identity, it forwards this SM signaling to the corresponding SMF;

When the PDU session is torn down, the SMF indicates to the MMF the release of the PDU session identity. The MMF removes the association between the SMF Id and the PDU session Id.

However, the solution of Paragraph 6.4.16 has not clearly defined that the MMF allocates a PDU session identity when and how.

Accordingly, an embodiment of the present invention proposes two methods of allocating, by the MMF, a PDU session identity.

First, the first method is described below with reference to FIG. 9 again.

The MMF allocates the PDU session identity at step 902 when the MMF receives create PDU session request message from the UE at step 901.

Then the MMF forwards the received create PDU session request message with a newly allocated the PDU session identity to the SMF at step 903. The MMF makes an association between the SMF ID and the PDU session identity.

When the SMF receives the request message and accepts to establish the PDU session, the SMF sends create PDU session accept message to the MMF with the PDU session identity at step S904.

Then, the MMF forwards the received create PDU session accept message to the UE at step S905.

However, if the SMF rejects to establish the PDU session, the allocated the PDU session identity should be deallocated by the MMF and the association between the SMF Id and the PDU session identity should be removed.

Thus, if the SMF rejects to establish the PDU session, the SMF sends create PDU session reject message to the MMF at step 906.

When the MMF receives create PDU session reject message from the SMF, the MMF deallocates the allocated the PDU session identity and removes the association between the SMF Id and the PDU session identity at step 907.

Then, the MMF forwards the received create PDU session reject message to the UE at step S908.

This method assumes that the MMF recognize the exact type of the SM message, i.e., whether the SM message is create PDU session request message or create the PDU session accept/reject message.

Next, the second method is described below with reference to FIG. 10 again.

The second method is to allocate a PDU session identity when the MMF receives an explicit request from the SMF.

The MMF transparently relays a create PDU session request message to the SMF at step 1002 when the MMF receives the create PDU session request message from the UE at step 1001.

If the SMF accepts the request, the SMF requests the allocation of the PDU session identity from the MMF at step 1003. That is, the SMF sends a PDU session ID allocation request message to the MMF.

The MMF allocates the PDU session identity and makes an association between the SMF ID and the PDU session identity at step 1004.

The MMF sends the PDU session ID allocation response message with the PDU session identity at step S1005.

When the SMF accepts to establish the PDU session, the SMF sends a create PDU session accept message to the MMF at step S1006.

Then, the MMF forwards the received create PDU session accept message to the UE at step S1007.

However, if the SMF rejects to establish the PDU session, the SMF sends a create PDU session reject message to the MMF at step 1008.

Then, the MMF forwards the received create PDU session reject message to the UE at step S1009.

As described above, if the SMF rejects the request, the SMF does not request the allocation of the PDU session identity. In this method, the MMF does not need to know what type of SM message is forwarded to the SMF or UE.

However, this method may increase inter-MMF and SMF signaling because the PDU session identity allocation request/response message is generated whenever a new PDU session is created. Also when the PDU session is released, the PDU session identity deallocation request/response messages are exchanged between the MMF and the SMF.

Considering the number of message exchanges between the MMF and the SMF, it is proposed that the MMF allocates a PDU session identity when it receives a create PDU session request message.

Therefore, the MMF allocates the PDU session identity when it receives a create PDU session request message from UE. The MMF relays the SM message to the SMF having an allocated PDU session identity.

This solution assumes that only one MMF is present when UE is attached to a network. According to the current interim agreement, a single NG1 NAS connection is used when UE is attached via 3GPP access. There is no agreement about whether the same MMF is used when UE is attached simultaneously via 3GPP and non-3GPP accesses.

So it is proposed that if a different MMF is allocated when UE attached simultaneously via 3GPP and non-3GPP accesses, each entity (i.e., UE, MMF or SMF) stores a PDU session identity for each access network. If the same MMF is allocated, the PDU session identity may be stored without the distinction of access networks.

Therefore, if a different MMF is allocated when UE is attached simultaneously via 3GPP and non-3GPP accesses, each entity (i.e., UE, MMF or SMF) stores a PDU session identity for each access network. Otherwise, if the same MMF is allocated, the PDU session identity is stored without the distinction of access networks.

Session management and service continuity are arranged as follows based on the contents of the above description.

- A NextGen system shall support UE establishing multiple separate the PDU sessions, to the same data network or to different data networks, via 3GPP and Non-3GPP access networks at the same time In this case each the PDU session is routed over only a single access network. The choice of the access to use for a PDU session is based at least on network policy, service requirements and user subscription
- A NextGen system should support the PDU sessions to the same data network where the traffic of a PDU session may be simultaneously carried over multiple access, and where one access is a 3GPP access and the other is a non-3GPP.
- A NextGen system should support the ability to have multiple PDU sessions to the same data network and served by different UP functions terminating NG6.
- The user plane format in NextGen on NG3 and between UP functions shall at least support per PDU session tunneling. This applies to both non-roaming and roaming UP interfaces.
- The following the PDU session types are supported: IPv4, IPv6, Ethernet, Unconfigured.
- As the same set of features and use cases may not be applicable to both IPv4 and IPv6 (e.g., multi-homing, access to local network etc) it is beneficial to treat IPv4 and IPv6 separately in NextGen CN. Therefore, for the first normative release, the PDU sessions for PDU type IP shall contain only one IP version. This implies:
- The NextGen core (NGC) supports dual stack UE by using separate the PDU sessions for IPv4 and IPv6.
- The NGC does not support dual stack PDU session (PDU session type IPv4v6).
- UE may ATTACH to the network without requiring the establishment of any PDU Session.
- For the 3GPP access the user plane path in the NextGen core consists of user plane functions (UPF).
- For UE having multiple PDU sessions, there is no need for a mandatory "convergence point" similar to the SGW. In other words, going out of the AN, the user plane paths of different PDU Sessions (to the same or to different DNN) belonging to the same UE may be completely disjoint. This also implies that for idle mode UEs (if NextGen IDLE state is supported) there may be a distinct buffering node per PDU Session.
- In the case of deployments with SM the PDU session control in the HPLMN, for one PDU session
- An SMF entity in the serving PLMN and an SMF entity in the HPLMN are involved.
- At least UPF in the serving PLMN and at least UPF in the HPLMN are involved.
- In order to facilitate the introduction by an HPLMN of new features for the PDU sessions, NGC specifications shall support deployments with SM PDU session control in the HPLMN where only the HPLMN is responsible of enforcing (service delivery) and controlling (e.g., subscription check) some parameters (e.g., related with the service on NG6) of the PDU session:
- This means that the SMF in a visited PLMN (VPLMN) is not meant to understand some of the information exchanged between the UE and the network in NAS signaling but relays it transparently to the SMF in a home PLMN (HPLMN). The SMF in the HPLMN is responsible for checking whether via this NAS information transparently relayed by the SMF in VPLMN is compliant with the user subscription.
- The SMF in the VPLMN is nevertheless assumed to understand some of the NAS information related with a PDU session for deployments with SM the PDU session control in the HPLMN.
- The SMF in the VPLMN needs to handle and to check with regard to roaming agreements QoS requests from the SMF in HPLMN.
- For home-routed traffic, a UPF in the VPLMN is allocated to support a PDU session. For example, this is to enable the routing of traffic of a PDU session between the HPLMN and the VPLMN, to minimize the impact on the HPLMN of the UE mobility within the VPLMN (for scenarios where SSC1 is applied), and to avoid requiring for idle mode UEs (if NextGen IDLE state is supported) that the UPF in the HPLMN acts as buffering node for the PDU Session.
- The establishment of a PDU Session may be authorized/authenticated by an external DN via SMF.
- The principle of the session and service continuity (SSC) modes described is endorsed with following additions:
- "CN-prepared PDU Session modification followed by notification to UE (SSC mode 3)" is only endorsed for IPv6 traffic.
- The principle of the Uplink Classifier is supported for the PDU sessions of type IP or Ethernet.
- The principle of the multi homed the PDU sessions is endorsed for IPv6 traffic
- Furthermore, an interaction is described in brief as follows based on the contents of the above description with respect to the MM and the SM.
- A single NG1 NAS connection is used for both MM- and SM-related messages and procedures for UE. The single NG1 termination point is located in MM.
- The MMF and the SMF are separate network functions (NFs), with a standard NG11 interface specified in-between. The MMF handles the mobility management part of NAS signaling exchanged with UE. The SMF handles the Session management part of NAS signaling exchanged with UE.
- UE having multiple established PDU sessions may be served by different instances of the SMF. The MMF selects the SMFs for the PDU sessions. In order to select proper the SMF, the MMF uses session related information (e.g., DNN) provided by the UE. The MMF may select different SMFs for different PDU sessions.
- The MMF forwards SM-related NAS information to the SMF.
- When the MMF receives the SM message which requests to establish a new PDU session, the MMF allocates PDU session identity and forwards the SM message with the allocated PDU session identity.
- At this moment, the MMF stores an association between the SMF ID and the PDU session identity. When the MMF receives SM message which accepts release of the existing the PDU session, the MMF deallocates the PDU session identity and removes an association between the SMF ID and the PDU session identity.
- According to the conclusion of overall architecture, if different MMF is allocated when the UE attached simultaneously via 3GPP and non-3GPP accesses, each entity (e.g., UE, the MMF, the SMF) stores the PDU session identity per access network. Otherwise, if the same MMF is allocated, the PDU session identity is stored without distinction of access network.

- A NextGen system supports the independent activation/deactivation of UE-CN user plane connection per the PDU session.
- The SMF(s) supports the end-to-end control functions on the PDU sessions (including any NG4 interface to control the UPF(s)),
- (when multi-slicing per group B applies) In case of UE served by multiple slice instances there are multiple instances of the SMF that serve the UE.
- NG2 signaling related with UE is terminated in the MMF, i.e., there is an unique NG2 termination for a given UE regardless of the number of the PDU sessions (possibly zero) of UE.
- NAS MM messages and NAS SM messages and the corresponding procedures are decoupled, so that the NAS routing capabilities inside the MMF may easily know if one NAS message should be routed to a SMF, or locally processed in the MMF. It is possible to transmit an SM NAS message together with an MM NAS message.
- the MMF may decide whether to accept the MM part of a NAS request without being aware of the possibly concatenated SM part of the same NAS signaling contents.
- Some NG2 signaling (such as Hand-Over related signaling) may require the action of both the MMF and the SMF. In such case, the MMF is responsible to ensure the coordination between the MMF and the SMF
- This may correspond to the following interaction:
- NG2 impacts of SM events:

a. At the set-up/modification/release of a PDU session: the SMF interacts with RAN via MMF for setup, modification and release of radio and NG3 resources for the PDU session.

b. At the set-up/modification of QoS for GBR flows or modification of QoS rules for non-GBR flows, the SMF interacts with the RAN via MMF to provide the QoS information.

The impacts of MM events are as follows:

a. At the transition from IDLE to CONNECTED: the SMF interacts with the RAN via an MMF for setting up of radio and NG3 resources for the PDU session.

b. During handover: the SMF interacts with the MMF at least to receive from the RAN the NG3 DL information.

c. When UE becomes IDLE, the MMF notifies the SMF(s) in order for the SMF(s) to modify the settings for DL data forwarding in the NGUP(s) for NG3.

d. When it is made aware by the NGUP that some DL data has arrived for the UE in IDLE mode (and the UE is not known to be in a power saving state), the SMF interacts with the MMF in order to trigger UE paging from the AN (depending on the type of the AN).

e. The SMF may need to interact with the MMF in order to be able to control the NGUP(s) based on the power saving state of the UE.

f. When the UE sends (non periodic) TAU request to the MMF, the MMF may need to notify the SMF(s) so that the SMF(s) may determine whether user plane function relocation is required or not (based on SSC mode and on the new user location).

- The SMF needs to receive the permanent user identity of the UE.
- When the SMF needs to send NAS SM signaling to UE, it provides information allowing the MMF to retrieve the corresponding UE NAS signaling context.

An interworking (including mobility) scenario between core networks (e.g., an NG core and an EPC) to which the present invention may be applied is as follows.

An operator has not upgraded all the installed E-UTRAN nodes, has upgraded only parts of the installed E-UTRAN nodes to support the new CN-RAN NG2 (i.e., Reference point for the control plane between NextGen (R)AN and NextGen Core)/NG3 (i.e., Reference point for the user plane between NextGen (R)AN and NextGen Core), or has deployed for macro coverage and stand-alone NR with NextGen CN for e.g. small cells. CN interworking is provided from EPC to NextGen CN to provide full service continuity.

It is assumed that on the radio side the upgraded E-UTRAN supports the legacy LTE-Uu interface.

UE capable of supporting the NG NAS via the NG1 (i.e., Reference point for the control plane between NextGen UE and NextGen Core) interface may be called an NG core (NGC)-capable UE.

It is assumed that in addition NGC UE is capable of supporting:

- An EPC NAS: this is NAS protocol defined for EPC, at least to operate in legacy networks e.g. in case of roaming.
- The UE will use EPC NAS or NG NAS depending on the core network by which it is served.
- The UE will always use the NG NAS when connecting to the NG RAN. The UE may use the NG NAS when connecting to E-UTRAN.

In all the architectures for the various scenarios, it is assumed that the EPC and the NGC have access to a common subscriber database.

In this solution, all interworking scenarios assume single-CN registration at any point in time for the 3GPP RATs (i.e., similar to EPC).

Service continuity is provided for the various scenarios as described below.

FIG. 14 illustrates architecture for tight interworking in a wireless communication system to which the present invention may be applied.

In this solution, an NGx interface is introduced between the MME and NG core AMF in order to enable interworking between EPC and the NG core. NGx is an inter-CN interface PCF+PCRF is involved if policy and charging is controlled in a dynamic way.

A policy control function (PCF)+a policy and charging rules function (PCRF), a PGW control plane (PGW-C)+an SMF and UPF+PGW user plane (PGW-U) are dedicated for interworking between the NextGen system (NGS) and the EPS, which are optional and are based on UE and network capabilities. UEs that are not subject to EPS and NGS interworking may be served by entities not dedicated for interworking, i.e., either by the PGW/PCRF or the SMF/UPF/PCF.

Even though not shown in the FIG. 14, there may be another UPF between the NG RAN and the UPF+PGW-U, i.e., UPF+PGW-U may support NG9 towards the additional UPF, if needed.

When connecting to the E-UTRAN, UE uses EPC NAS with the core network. In such a scenario, when connected to a non-evolved E-UTRAN, the UE authentication, mobility management and session management are performed by the MME towards the UE.

In order to support idle or connected mode mobility between EPC and NG Core, the UEs serving MME connects via a control plane NGx interface to CP functions in the NGC, and the UE's serving SGW connects via a user plane S5-U interface to user plane functions in the NGC and via a control plane S5-C interface to CP functions in the NGC. A user plane should always be anchored in NG CN for UE with NG RAN subscription. The GW selection may still be done by the MME with the current mechanisms, and will result in a GW in the 5G CN.

Interworking with NextGen in this solution is performed by:

Enabling UE to perform initial attach over E-UTRAN using EPC NAS, and later move to an evolved E-UTRAN or 5G NR and use NG NAS by interworking with the NG core (e.g., moving the UE context to the NG core). During initial attach the UE user plane may be anchored in user plane function(s) provided by the NGC to support mobility.

Enabling the UE to perform initial attach and session management over the evolved E-UTRAN or 5G NR using NG1, and later move to the E-UTRAN and use EPC NAS by interworking with the NG core (e.g., moving the UE context from the NG core).

Service continuity is provided between the E-UTRAN and the NG RAN options deployed by the operator via Interworking Function and the common anchoring of the user plane. Inter-RAN PDU forwarding may be supported.

FIG. 14 illustrates architecture when the EPC and the 5G core network operate in conjunction with each other. If UE served by the EPC moves to a 5G network while performing handover, the corresponding UE needs to continue to be served by switching existing PDNs used in the EPC switch from the 5G core network to a PDU session. To this end, in the handover process, UE context is exchanged between the MME and the AMF. The UE context includes information about the PDN session of the UE.

How a PDU session ID is allocated when UE handovers from the EPC to the 5G core network is described below with reference to FIG. 15.

FIG. 15 is a diagram illustrating a method for allocating a PDU session ID upon handover according to an embodiment of the present invention.

1. The E-UTRAN determines to handover UE served over the E-UTRAN from the E-UTRAN (e.g., eNB) to the 5G RAN due to a radio condition.

2. If the E-UTRAN determines to handover the UE from the E-UTRAN to the 5G RAN, the E-UTRAN notifies the MME of such handover. That is, the E-UTRAN sends a handover required message to the MME.

In this case, the handover required message may include a target 5G RAN identity (ID) and a source to target transparent container.

The source to target transparent container may include information that needs to be transparently transferred by core network entities from a source RAN (i.e., the E-UTRAN) to a target RAN (i.e., the 5G RAN).

In this case, the MME may request EPS bearer context, including mapped SM context, from the PGW.

3. The MME may hand over the context of the corresponding UE, owned by the MME, to the AMF.

That is, the MME sends a relocation request message to the AMF (or the MMF or a common CP function).

In this case, the relocation request message may include the UE context. For example, the UE context may include an international mobile subscriber identity (IMSI), a mobile equipment (ME) identity, UE security context, an aggregate maximum bit-rate (AMBR), an S-GW address and/or EPS bearer context (e.g., a P-GW address, an access point name (APN) and an S-GW address).

Furthermore, the relocation request message may include a target 5G RAN ID and a source to target transparent container.

4. The AMF selects an SMF based on the UE context information (e.g., PDN connection information (or EPS bearer context) owned by the UE) received from the MME.

In this case, the P-GW address to which a PDN connection is connected may be used as the information necessary to select the SMF.

a. If the method of Option 2 is used to allocate a PDU session ID, the AMF may allocate a network slice ID (e.g., NSI identity) in addition to the PDU session ID. In this case, the PDU session may be identified by a combination of the NSI identity and the PDU session ID.

If multiple SMFs are present in a single network slice, a process of additionally allocating an ID (e.g., SMF identity) unique to each SMF within each network slice is performed. In this case, the PDU session may be identified by a combination of the NSI identity, the SMF identity and the PDU session ID.

b. If the method of Option 3 is used to allocate a PDU session ID, the AMF may directly allocate the PDU session ID and transfer it to the SMF at step 5. In this case, the PDU session may be identified by the PDU session ID.

If multiple PDU sessions are present in a single SMF, the SMF needs to be notified of a PDU session ID allocated to each PDN connection (i.e., PDU session).

5. The AMF sends a request for establishing a PDU session to the SMF selected at step 4. That is, the AMF sends a session creation (or modification) request message to the SMF.

In this case, the AMF may send a session creation (or modification) request message to the SMF for each PDN connection (i.e., PDU session).

In this case, the determined PDU session ID information is transferred to the SMF depending on each option at step 4. That is, if the method of Option 2 is used at step 4, a network slice ID (e.g., NSI identity)+the SMF ID information may be transferred to the SMF. Alternatively, if the method of Option 3 is used at step 4, the PDU session ID information may be transferred to the SMF.

6. The SMF determines a PDU session ID.

In this case, the SMF may determine the PDU session ID based on the information received from the AMF.

a. If the method of Option 1 is used to allocate a PDU session ID, the SMF allocates a PDU session ID within a preconfigured PDU session ID pool to the PDU session regardless of the information received from the AMF.

b. If the method of Option 2 is used to allocate a PDU session ID, the SMF allocates a (local) PDU session ID to the PDU session along with a network slice ID (e.g., NSI identity)+SMF ID information received from the AMF. That is, the SMF allocates the PDU session ID to the PDU session by combining the network slice ID+the SMF ID+the (local) PDU session ID.

c. If the method of Option 3 is used to allocate a PDU session ID, the SMF determines to allocate the PDU session ID to the PDU session using the PDU session ID received from the AMF without any change.

d. If the method of Option 4 is used to allocate a PDU session ID, the SMF includes its own globally unique ID value in the PDU session ID when allocating the PDU session ID, and allocates the PDU session ID to the PDU session.

Furthermore, the SMF also notifies the AMF of information about the PDU session ID allocated at step 6. That is, the SMF sends a session creation (or modification) response message to the AMF.

The AMF that has received the session creation (or modification) response message from the SMF stores the PDU session ID and association with the SMF, and stores information about how each PDN connection (i.e., PDU session) is mapped to which PDU session ID.

7. The AMF makes the 5G RAN prepare for handover of the UE by sending a handover request message to the 5G RAN.

8. After the 5G RAN prepares radio resources based on radio information received from the E-UTRAN, it notifies the AMF that it has been prepared for handover by sending a handover request acknowledgement message to the AMF.

9. The AMF notifies the MME that both the 5G RAN and the 5G core have finished the preparation of handover by sending a relocation response message to the MME.

10. The MME performs an operation for creating a forwarding tunnel for sending downlink packets generated during handover to the 5G core.

11-12. The MME sends a handover command to the E-UTRAN after all of handover preparation operations are completed. Furthermore, the E-UTRAN instructs the UE to handover to the 5G RAT, that is, a target access network, by sending the handover command to the UE.

13-14. When the UE successfully accesses the 5G RAT (i.e., when the 5G RAT receives a handover complete message from the UE), the 5G RAT notifies the AMF that the handover is successful completed by sending a handover notify message to the AMF.

15-16. The AMF notifies the SMF that the handover has been completed by sending a session creation (or modification) request message to the SMF+PGW-C. Furthermore, the SMF+PGW-C performs acknowledgement by sending a session creation (or modification) response message as a response to the session creation (or modification) request message.

From this moment, the SMF starts to send downlink traffic to the 5G RAN.

17. Thereafter, the MME/AMF on which the handover has been performed releases the forwarding tunnel.

18. After the handover is completed, the UE performs registration update (e.g., a tracking area update operation). In this process, the AMF sends information about which PDN connection has been mapped to which PDU session based on the information stored at step 6 and the allocated PDU session ID to the UE through a registration update accept message. In addition, the AMF may send additional information (e.g., information about a session and a service continuity mode) about the PDU session to the UE.

FIG. 16 is a diagram illustrating a method for allocating a PDU session ID according to an embodiment of the present invention.

Referring to FIG. 16, the SMF (or SMF node) receives a create session request message that requests the establishment of a PDU session from the AMF (or AMF node) (S1601).

In this case, if UE requests the establishment of a PDU session from a network due to a reason, such as the first access of the UE to a network, as in FIGS. 7 to 10 or FIG. 13 and/or while UE performs a handover procedure from a first wireless communication system (e.g., LTE/LTE-A system or EPC) to a second wireless communication system (e.g., 5G system) as in FIG. 15, the create session request message may be transmitted from the AMF to the SMF.

Furthermore, the name of the create session request message is only an example, and another name may be used as a message to request the establishment of a PDU session.

When the SMF receives the create session request message, it determines a PDU session identity for a PDU session established for UE (S1602).

a. The SMF node may determine the PDU session identity for the PDU session for the UE by selecting the PDU session identity randomly or according to a predetermined rule within a PDU session ID pool configured for the SMF node.

b. Alternatively, the SMF may determine the PDU session identity for the PDU session for the UE by combining a network slice identity to which the SMF belongs and an identity for locally identifying a PDU session within the SMF.

In this case, the network slice identity may be allocated by the AMF, may be included in the create session request message at step S1601, and may be transmitted by the AMF.

If multiple SMFs are present in a network slice, the SMF may determine the PDU session identity for the PDU session for the UE by combining an SMF identity for identifying each SMF within a network slice, the network slice identity to which the SMF belongs, and the identity for locally identifying the PDU session within the SMF.

In this case, the network slice identity and the SMF identity of the SMF may be allocated by the AMF, may be included in the create session request message at step S1601, and may be transmitted by the AMF.

c. Alternatively, the SMF may receive the PDU session identity for the PDU session for the UE through the create session request message at step S1601 from the AMF. In this case, the SMF may determine a PDU session ID to be used in the PDU session using the PDU session ID received from the AMF without any change.

More specifically, when the AMF receives the create session request message from the UE, it may allocate a PDU session identity. Furthermore, the AMF may transfer the create session request message, including the allocated PDU session identity, to the SMF at step S1601. In this case, the AMF may create association between the ID (i.e., SMF ID) of the corresponding SMF and the PDU session identity.

d. Alternatively, the SMF may determine the PDU session identity for the PDU session for the UE by combining a globally unique ID value allocated thereto and an identity for locally identifying a PDU session within the SMF.

The SMF sends a create session response message, including the PDU session identity determined at step S1602, to the AMF in response to the create session request message (S1603).

Furthermore, the AMF that has received the create session response message from the SMF stores association between the PDU session ID and the SMF, and stores information about how each PDN connection (i.e., PDU session) is mapped to which PDU session ID.

If the AMF receives a create session reject message from the SMF other than the create session response message or receives indication having the same meaning from the SMF, it is necessary to deallocate the PDU session identity allocated by the AMF.

More specifically, when the AMF receives the create session reject message from the SMF or receives indication having the same meaning from the SMF (i.e., when the creation/establishment of the PDU session are rejected), the AMF deallocates the allocated PDU session identity. In this case, the AMF may remove association between the ID (i.e., SMF ID) of the corresponding SMF and the PDU session identity.

In this case, the name of the create session response message is only an example, and another name may be used as a message including the PDU session identity, that is, a response to the create session request message.

Furthermore, the name of the create session reject message is only an example, and another name may be used as a message for rejecting the creation of a session, that is, a response to the create session request message.

Device to which the Present Invention May be Applied

FIG. 17 is a block diagram illustrating the configuration of a communication device according to an embodiment of the present invention.

Referring to FIG. 17, a wireless communication system includes a network node 1710 and a plurality of pieces of UE 1720.

The network node 1710 includes a processor 1711, memory 1712, and a communication module 1713. The processor 1711 implements the functions, processes and/or methods proposed in FIGS. 1 to 16. The layers of a wired/wireless interface protocol may be implemented by the processor 1711. The memory 1712 is connected to the processor 1711 and stores various pieces of information for driving the processor 1711. The communication module 1713 is connected to the processor 1711 and transmits and/or receives a wired/radio signal.

The network node 1710 may be an SMF, an AMF, a BS, an MME, an HSS, an SGW or a PGW, for example. More specifically, if the network node 1710 is a BS, the communication module 1713 may include a radio frequency (RF) unit for transmitting/receiving a radio signal.

The UE 1720 (e.g., terminal) includes a processor 1721, memory 1722, and a communication module (or RF unit) 1723. The processor 1721 implements the functions, processes and/or methods proposed in FIGS. 1 to 16. The layers of a wireless interface protocol may be implemented by the processor 1721. The memory 1722 is connected to the processor 1721 and stores various pieces of information for driving the processor 1721. The communication module 1723 is connected to the processor 1721 and transmits and/or receives a radio signal.

The memories 1712 and 1722 may be present inside or outside the processors 1711 and 1721 and may be connected to the processors 1711 and 1721, respectively, by various well-known means. Furthermore, the network node 1710 (in the case of a BS) and/or the UE 1720 may have a single antenna or multiple antennas.

FIG. 18 is a block diagram illustrating the configuration of a communication device according to an embodiment of the present invention.

Particularly, FIG. 18 is a block diagram specifically illustrating the UE of FIG. 17.

Referring to FIG. 18, the UE may include a processor (or digital signal processor (DSP)) 1810, an RF module (or RF unit) 1835, a power management module 1805, an antenna 1840, a battery 1855, a display 1815, a keypad 1820, memory 1830, a subscriber identification module (SIM) card 1825 (optional), a speaker 1845 and a microphone 1850. The UE may include a single antenna or multiple antennas.

The processor 1810 implements the functions, processes and/or methods proposed in FIGS. 1 to 16. The layer of a wireless interface protocol may be implemented by the processor 1810.

The processor 1810 is connected to the processor 1810 and stores information related to the operation of the processor 1810. The memory 1830 may be located inside or outside the processor 1810 and may be connected to the processor 1810 by various well-known means.

A user inputs, for example, instruction information such as a phone number by pressing (touching) a button of the keypad 1820 or by voice activation using the microphone 1850. The processor 1810 performs an appropriate function, such as the reception of such instruction information and making a phone call to a phone number. Operational data may be extracted from the SIM card 1825 or the memory 1830. Furthermore, for user recognition and convenience, the processor 1810 may display instruction information or driving information on the display 1815.

The RF module 1835 is connected to the processor 1810 and transmits and/or receives an RF signal. In order to start communication, the processor 1810 transfers, for example, instruction information to the RF module 1835 and transmits a radio signal forming voice communication data. The RF module 1835 is configured to include a receiver and a transmitter for receiving or sending a radio signal. The antenna 1840 performs the function of transmitting or receiving a radio signal. When receiving a radio signal, the RF module 1835 may transfer the signal so that it is processed by the processor 1810 and may convert the signal having a baseband. The processed signal may be converted into audible or readable information and output through the speaker 1845.

In the aforementioned embodiments, the elements and characteristics of the present invention are combined in a predetermined form. Unless phrases explicitly represent, it should be considered that each element or characteristic is selective. Each element or characteristic may be implemented in a form in which the element is not combined with other elements or characteristics. Furthermore, an embodiment of the present invention may be configured by combining some configurations and/or characteristics. The sequence of the operations described in the embodiments of the present invention may be changed. Some configurations or characteristics of any embodiment may be included in another embodiment or may be replaced with a configuration or a characteristic corresponding to another embodiment. It will become apparent that claims that are not in an explicit cited relation in the claims may configure an embodiment by combination and may be included in new claim by amendment after filing.

The embodiment of the present invention may be implemented by various means, for example, hardware, firmware, software, or combinations thereof. When an embodiment of the present invention is implemented by hardware, it may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When an embodiment of the present invention is implemented by firmware or software, it may be implemented in the form of a module, procedure, and function that perform the aforementioned function or operation. A software code may be stored in the memory to be driven by the processor. The memory may be located inside or outside the processor and may transmit or receive data to or from the processor by already known various means.

It will become apparent to a person having ordinary skill in the art that the present invention may be embodied in different specific forms without departing from the essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

An embodiment of the present invention mainly describes an example applied to a 3GPP LTE/LTE-A system or 5G system, but may be applied to various wireless communication systems other than the 3GPP LTE/LTE-A system and 5G system.

What is claimed is:

1. A method for determining, by a session management function (SMF) node, a packet data network (PDU) session identity for one or more PDU sessions of user equipment (UE) in a wireless communication system, the method comprising:
    receiving a request message for requesting an establishment of a PDU session for the UE from an access and mobility management function (AMF) node while the UE performs a handover procedure from a first wireless communication system to a second wireless communication system;
    determining a PDU session identity for the PDU session established for the UE when the request message is received; and
    sending a response message including the determined PDU session identity to the AMF node in response to the request message,
    wherein the PDU session identity for the PDU session is determined by combining a specific identity and an identity for locally identifying the PDU session within the SMF node,
    wherein the specific identity includes a network slice identity to which the SMF node belongs or a globally unique ID allocated to the SMF node.

2. The method of claim 1, wherein:
    a network slice comprising an access network (AN) and a core network (CN) is included in the second wireless communication system,
    the AN and the AMF node are common to multiple network slices, and
    the SMF node belongs to each network slice.

3. The method of claim 1, wherein:
    the network slice identity is allocated by the AMF node, and
    the network slice identity is included in the request message and received from the AMF node.

4. The method of claim 2, wherein if multiple SMFs are present in the network slice, the PDU session identity for the PDU session is determined by combining an SMF identity for identifying each SMF node within the network slice, a network slice identity to which the SMF node belongs and an identity for locally identifying the PDU session within the SMF node.

5. The method of claim 4, wherein the network slice identity and the SMF identity of the SMF node are allocated by the AMF node and are included in the request message and received from the AMF node.

6. The method of claim 1, wherein the PDU session identity for the PDU session is allocated by the AMF node and determined by receiving the PDU session identity through the request message from the AMF node.

7. The method of claim 6, wherein when the PDU session identity is allocated by the AMF node, an association between the PDU session identity and an identity of the SMF node is generated by the AMF node.

8. The method of claim 7, wherein when the establishment of the PDU session is rejected, the association between the PDU session identity and the identity of the SMF node is removed by the AMF node.

9. The method of claim 1, wherein the PDU session identity for the PDU session is determined within a PDU session ID pool configured in the SMF node.

10. A session management function (SMF) node for determining a packet data network (PDU) session identity for one or more PDU sessions of user equipment (UE) in a wireless communication system, the SMF node comprising:
    a communication module configured to send or receive a signal; and
    a processor configured to control the communication module, wherein the processor is configured to:
    receive a request message for requesting an establishment of a PDU session for the UE from an access and mobility management function (AMF) node while the UE performs a handover procedure from a first wireless communication system to a second wireless communication system,
    determine a PDU session identity for the PDU session established for the UE when the request message is received, and
    send a response message including the determined PDU session identity to the AMF node in response to the request message,
    wherein the PDU session identity for the PDU session is determined by combining a specific identity and an identity for locally identifying the PDU session within the SMF node,
    wherein the specific identity includes a network slice identity to which the SMF node belongs or a globally unique ID allocated to the SMF node.

* * * * *